(12) United States Patent
Thorley et al.

(10) Patent No.: US 8,516,582 B2
(45) Date of Patent: *Aug. 20, 2013

(54) METHOD AND SYSTEM FOR REAL TIME CLASSIFICATION OF EVENTS IN COMPUTER INTEGRITY SYSTEM

(75) Inventors: Jeb Stuart Thorley, Kingston (CA); Justin Alexander Foster, Kanata (CA)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,068

(22) Filed: Apr. 25, 2012

(65) Prior Publication Data

US 2012/0216278 A1 Aug. 23, 2012

Related U.S. Application Data

(63) Continuation of application No. 12/628,431, filed on Dec. 1, 2009, now Pat. No. 8,171,547.

(60) Provisional application No. 61/119,475, filed on Dec. 3, 2008.

(51) Int. Cl.
| | |
|---|---|
| *G06F 11/00* | (2006.01) |
| *G06F 12/14* | (2006.01) |
| *G06F 12/16* | (2006.01) |
| *G06F 7/04* | (2006.01) |
| *G06F 17/30* | (2006.01) |
| *G06F 9/00* | (2006.01) |
| *G06F 9/24* | (2006.01) |
| *G06F 15/177* | (2006.01) |
| *G06F 9/44* | (2006.01) |
| *G06F 9/445* | (2006.01) |

(52) U.S. Cl.
USPC ............... 726/22; 726/23; 726/24; 726/27; 713/1; 713/2; 713/188; 717/168; 717/169; 717/170; 717/171; 717/172; 717/173; 717/174; 717/175; 717/176; 717/177; 717/178

(58) Field of Classification Search
USPC ... 726/22–24, 27; 713/1, 2, 188; 717/168–178
See application file for complete search history.

(56) References Cited

U.S. PATENT DOCUMENTS

| | | | |
|---|---|---|---|
| 5,621,663 | A | 4/1997 | Skagerling |
| 5,982,899 | A | 11/1999 | Probst |
| 6,212,581 | B1 | 4/2001 | Graf |
| 6,412,026 | B1 | 6/2002 | Graf |
| 7,024,548 | B1 | 4/2006 | O'Toole, Jr. |

(Continued)

OTHER PUBLICATIONS

Tripwire Inc., Configuration Control for Virtual and Physical Infrastructures, White paper| File Integrity Monitoring: Compliance and Security for Virtual and Physical Environments, 2008, 15 p., www.tripwire.com, Tripwire, Inc.

(Continued)

*Primary Examiner* — Edan Orgad
*Assistant Examiner* — Kari Schmidt
(74) *Attorney, Agent, or Firm* — IP-Mex Inc.; Victoria Donnelly

(57) ABSTRACT

Method and system using a designated known secure computer for real time classification of change events in a computer integrity system are disclosed. In the embodiment of the invention, the known secure computer, having only inbound connection, is dedicated for providing permissible change events, which are compared with change events generated on client operational computers. An alert is generated when the change event at the client operational computer and the respective permissible change event provided by the known secure computer mismatch.

20 Claims, 14 Drawing Sheets

(56) References Cited

U.S. PATENT DOCUMENTS

| | | |
|---|---|---|
| 7,509,678 B2 | 3/2009 | Pearson et al. |
| 7,539,971 B2 | 5/2009 | Lane et al. |
| 7,627,745 B2 | 12/2009 | Martinez et al. |
| 7,774,855 B2 | 8/2010 | Monroe et al. |
| 7,930,747 B2 | 4/2011 | Durie et al. |
| 7,996,896 B2 | 8/2011 | Durie |
| 8,051,298 B1 | 11/2011 | Burr et al. |
| 2004/0044693 A1 | 3/2004 | Hadley et al. |
| 2005/0120239 A1 | 6/2005 | Monroe et al. |
| 2006/0206943 A1 | 9/2006 | Ellison et al. |
| 2007/0016953 A1 | 1/2007 | Morris et al. |
| 2007/0261120 A1 | 11/2007 | Arbaugh et al. |
| 2008/0282351 A1 | 11/2008 | Khilnani et al. |
| 2009/0038011 A1 | 2/2009 | Nadathur |
| 2009/0089880 A1 | 4/2009 | Kobayashi et al. |
| 2009/0217258 A1 | 8/2009 | Wenzinger et al. |
| 2010/0175061 A1 | 7/2010 | Maeda et al. |
| 2010/0180343 A1 | 7/2010 | Maeda et al. |

OTHER PUBLICATIONS

R. Natarajan, Tripwire Tutorial: Linux Host Based Intrusion Detection System, Dec. 8, 2008, 10 p., http://www.thegeekstuff.com, Tripwire, Inc.

File Integrity Monitoring: Secure Your Virtual and Physical IT Environments, Sep. 2008, 5 p., http://whitepapers.zdne, CBS Interactive.

Sentinel Enterprise, File integrity monitoring delivers change compliance and control across the enterprise, Runtimeware Forums: Security and compliance simplified, Sep. 15, 2009, 1 p., http://www.runtimeware.com, Runtimeware.com.

File integrity checkers, Jun. 10, 2003-Jun. 2, 2008, 7 p., http://www.windowsecurity.com/software/File-integrity-checkers/, WindowSecurity.com, TechGenix Ltd.

Global Data Integrity, Xintegrity Professional, 2005, 4 p., Global Data Integrity.

Solidcore, File Integrity Monitoring Solution, 2003-2009, 1 p., http://www.solidcore.com/solutions/compliance/pci-file-integrity- . . . , McAfee, Inc.

Forrester Research, Inc., File Integrity Monitoring and Beyond: Protecting critical systems from unmanaged change, PC X-Ray: File Integrity Monitoring, Oct. 26, 2009, 2 p., NetIQ Corporation.

Tripwire Inc., IT Security & Compliance Management: Infrastructure-wide Visibility, Integrity & Control; Compliance Security Control: Configuration Assessment & Change Auditing Solutions, 2008, 22 p., Tripwire Inc.

V. Fox at al., UC Davis, Information and Educational Technology, Tripwire Enterprise Server Rule Sets, Jul. 25, 2006, 48 p., Tripwire Inc.

| ID | Fingerprint |
|---|---|
| 342 | 0019F857-C04A-CAA5-325C-E23D1CFB8008 |
| 238 | 001BE2FB-5F47-936A-E15C-6C372DC88ED8 |
| 516 | 003DEC4A-D0CB-3416-8716-9934396CAE8D |
| 732 | 0041B084-EB1A-B394-52DF-1BCB1BF689AB |
| FromID | ToID |
|---|---|
| 342 | 238 |
| 238 | 516 |
| 516 | 732 |
| 342 | 516 |
| 732 | 516 |
*Figure 8(c)*

| Description | Host | #Events | Tagged | Untagged | %Tagged | %Untagged | Total % |
|---|---|---|---|---|---|---|---|
| Fresh XP -- no service packs. Applied XP SP2 | bh-winxp-1 bh-winxp-2 | 1350 1349 | 1085 | 264 | 80.43% | 19.57% | 100% |
| XP SP3 from above. Updated Windows Update ActiveX Control. | bh-winxp-1 bh-winxp-2 | 9 9 | 5 | 4 | 55.56% | 44.54% | 100% |
| VM from test 2 above. Upgraded Windows Update + GA | bh-winxp-1 bh-winxp-2 | 32 32 | 4 | 28 | 12.5% | 87.5% | 100% |
| VM from test 3 above. KB952069 (SP3 Security Update) | bh-winxp-1 bh-winxp-2 | 20 20 | 5 | 15 | 25% | 75% | 100% |
| XP SP2 from above. Applied XP SP3 | bh-winxp-1 bh-winxp-2 | 1841 1842 | 1313 | 529 | 71.28% | 28.72% | 100% |

*Figure 9*

METHOD AND SYSTEM FOR REAL TIME CLASSIFICATION OF EVENTS IN COMPUTER INTEGRITY SYSTEM

RELATED APPLICATIONS

The present application is a Continuation application of U.S. application Ser. No. 12/628,431 filed on Dec. 1, 2009, which now has issued as a U.S. Pat. No. 8,171,547 on May 1, 2012, which claims benefit from the U.S. provisional application Ser. No. 61/119,475 filed in Dec. 3, 2008 for "Method and System Using Designated Template Hosts for Real Time Classification of Events in a Computer Integrity System", the entire contents of all applications and issued patent being incorporated herein by reference.

FIELD OF THE INVENTION

The present invention relates to the field of data security. More particularly, this invention relates to a method and system for real time classification of events used for verifying computer integrity in a computing system.

BACKGROUND OF THE INVENTION

The popularity of the Internet and the availability of a reliable underlying computer network have given rise to a great improvement in the effectiveness of dissemination and access of information over a wide area network. Employees in an enterprise, for example, may use an integrated system from different parts of the city and the world. The concomitant connectivity provided by the current communication technology has also given rise to problems such as unwanted intrusions that include attempts at accessing, maliciously manipulating, and disabling computer systems. Intrusion detection systems are thus built to detect such unauthorized and unwanted accesses before the integrity of the computer system is compromised. Checking every operation performed by a person manually is clearly inefficient and often impossible for an enterprise with a large number of employees. An automated intrusion detection system is thus used to detect various types of unauthorized access and operations performed on computer systems, which can compromise their security and dependability. These include attacks against services provided by the system, data driven attacks on applications, performing unallowable operations such as unpermissible software updates on the system as well as unauthorized logins and access to sensitive information.

There are many types of intrusion detection systems, each of which follows a different approach for intrusion detection.

Host-Based Intrusion Detection System (HIDS) monitors and analyzes the dynamic behavior and the state of a single computer and a distributed computing system or a computer network. A HIDS watches the system resources and keeps a record which programs are accessing them and what operations are being performed. If a program accesses any of the resources unexpectedly, the HIDS raises an alert. This can happen, for example, if a word-processing program suddenly starts to modify a system password database. In addition, the HIDS checks whether the stored information of a system appears as expected. The stored information of a system may be stored in a random access memory, in files of a file system, or elsewhere.

There are a few open source and commercially available HIDS, which enable system administrators to verify integrity of a computer system. Most of them require that a snapshot be created when an operating system is installed, and before the computer system is allowed to be connected to a network. By doing so, a trusted database of the file system containing the attributes of various software applications and the operating system, such as permissions and size, is created, and modifications dates and cryptographic hashes for associated files are saved. The database is created by way of a policy, defining parts of the computer system to be checked, and defining what is considered to be an unauthorized change. When the computer system is audited, a new snapshot is taken according to the defined policy. Then a sophisticated comparison between the original and the new snapshot is carried out to search for changes and generate change events in real time. These change events are subsequently checked by a human expert.

The challenge in Intrusion Detection systems is that a large volume of "uncategorized" change events is typically created. Change events are not inherently known to be acceptable or unacceptable without further correlation or human intervention. Changes can be correlated to other sources by using a variety of methods that include the following:

Manual user categorization and correlation with other systems, such as change control or patch management software;

Correlation with other previously accepted similar change events already accepted manually by a user; or Correlation with other still outstanding unaccepted change events, often called event repetition.

Despite the reduction in the number of change events by using the prior art methods mentioned above, a data volume generated by various remaining change events that need to be checked manually can be overwhelming.

Therefore there is a need in the industry for the development of an improved method and system for real time classification of events in a computer integrity system.

SUMMARY OF THE INVENTION

Therefore there is an object of the present invention to provide a method and system for real time classification of change events for verifying computer integrity in a computing system that mitigates the limitations of prior art.

According to one aspect of the invention, there is provided a method for real time classification of change events in a computing system, comprising one or more client operational computers, the method comprising:

(a1)) providing a known secure computer free from inbound connections from other computer systems, including installing an operating system and software application programs on the known secure computer, which are identical to the operating system and the software application programs running on the client operational computers;

(b1) at the known secure computer:
 (b1-i) visiting trusted hosts and checking for availability of software update for one or more client operational computers;
 (b1-ii) performing the software update in advance of the client operational computers;
 (b1-iii) generating change events at the known secure computer in response to the software update;

(c1) at each client operational computer, generating change events resulting from the software update performed on the client operational computer;

(e1) comparing the change events at the known secure computer with respective change events generated at each said client operational computer; and (f1) generating an alert for the change event, provided the change event at the known secure computer and the change event generated at the client operational computer differ.

Beneficially, the step (a1) comprises configuring the operating system installed on the known secure computer; and configuring a firewall on the known secure computer to prevent inbound connections.

The method further comprises scanning the known secure computer producing a first scan including attributes of software to be updated, the step being performed before t performing the software update at the known secure computer.

The step of generating change events at the known secure computer comprises: scanning the known secure computer producing a second scan comprising attributes of software that was updated; and
determining the change events at the known secure computer by comparing the first and the second scans.

The step of generating change events, resulting from the software update performed on the client operational computer, further comprises:
receiving the software update;
recording a first snapshot of the client operational computer, the first snapshot including attributes of software to be updated;
performing the software update;
generating a second snapshot of the client operational computer, the second snapshot including attributes of software that was updated; and
determining the change events by comparing the first snapshot and the second snapshot.

The method further comprises:
reading a profile associated with a type of the client operational computer, the profile specifying the attributes of software to be included in the first snapshot and the attributes of software to be included in the second snapshot; and
using the profile in recording the first and second snapshots.

Conveniently, the method further comprises:
storing the change events generated at the known secure computer as a first set of change events; and generating and storing a second set of change events, including change events generated by trusted users comprising third parties;
followed by comparing the change events generated at each said client operational computer with respective change events in the first and second sets of change events; and generating the alert for the change event generated at each said client operational computer that differs from respective change event in the first and second sets of change events.

Preferably, in the method described above,
the step of generating change events at the known secure computer further comprises applying a hash function to the change events generated at the known secure computer producing hashed change events at the known secure computer;
the step of generating change events at the client operations computer further comprises applying a hash function to the change events resulting from the software update performed on the client operational computer, producing hashed change events at the client operational computer;
the step of comparing change events comprises matching the hashed change events at the client operational computer with the hashed change events at the known secure computer; and
the step of generating the alert comprises generating an alert for the change event, provided the hashed change event at the known secure computer and the hashed change event at the client operational computer mismatch.

A computer readable storage medium, having computer readable program code instructions stored thereon, which, when executed by a processor, perform the steps of the method as described above, is also provided.

According to another aspect of the invention, there is provided a system for real time classification of change events in a computing system comprising one or more client operational computers, the system comprising:
(a11) a known secure computer free from inbound connections from other computer systems, the known secure computer having an operating system and software application programs, which are identical to the operating system and the software application programs running on the client operational computers, the known secure computer comprising:
a processor; and
a computer readable storage medium having computer readable instructions stored thereon for execution by the processor, forming a Known Secure Computing Module (KSCM), the KSCM comprising:
(a11-i) an Update Acquisition Module visiting trusted hosts and checking for availability of software update for said one or more client operational computers;
(a11-ii) a First Update Application Module performing the software update in advance of the client operational computers; and
(a11-iii) a First Change Event Generation Module generating change events at the known secure computer in response to the software update;
(b11) each client operational computer, comprising:
a processor; and
a computer readable storage medium having computer readable instructions stored for execution by the processor, forming a Deep Security Agent Module (DSAM) generating change events resulting from the software update performed on said each client operational computer;
(c11) one or more security host computers, each security host computer comprising:
a processor; and
a computer readable storage medium having computer readable instructions stored for execution by the processor, forming a System Integrity Change Characterization Module (SICCM), comprising:
(c11-i) a Processing Module comparing the change events in the first set of change events with respective change events generated at each said client operational computer and generating an alert for the change event, provided the change event in the first set of change events and the change event generated at the client operational computer differ.

The KSCM further comprises a Configuration Module configuring the operating system installed on the known secure computer and configuring a firewall on the known secure computer to prevent inbound connections.

In the system described above, the KSCM further comprises a First Scan Generation Module scanning the known secure computer producing a first scan comprising attributes of software to be updated; and
the First Change Event Generation Module (a11-iii) comprises:
(a14) a Second Scan Generation Module scanning the known secure computer producing a second scan including attributes of software that was updated; and (b14) A Change Event Determination Module determining the change events at the known secure computer by comparing the first and the second scan.

In the system of the embodiments of the invention, the DSAM further comprises:

(a15) a Receiver Module receiving the software update;
(b15) A First Snapshot Generator Module recording a first snapshot of the client operational computer, the first snapshot including attributes of software to be updated;
(c15) a second Update Application Module performing the software update;
(d15) A Second Snapshot Generation Module generating a second snapshot of the client operational computer, the second snapshot including attributes of software that was updated; and
(e15) a Second Change Event Generation Module determining the change events by comparing the first snapshot with the second snapshot.

Conveniently, the SICCM further comprises:
a Database Module for storing change events generated by the First Change Event Generation Module as a first set of change events; and
a Database of Imported Software Fingerprints Module storing change events generated by trusted users including third parties in a second set of change events.

Preferably, in the system described above,
the First Snapshot Generator Module and the Second Snapshot Generator Module respectively comprise a First Profile Reader Module and a Second Profile Reader Module reading a profile associated with a type of the client operational computer, the profile specifying the attributes of the software to be included in the first snapshot and the attributes of the software to be included in the second snapshot; and
computational means for using the profile in recording the first and second snapshots.

In an alternative embodiment of the invention, the Processing Module comprises a Comparator Module comparing the change events generated at each said client operational computer with respective change events in the first set of change events stored in the Database Module and the second set of change events stored in the Database of Imported Software Fingerprints Module, and generating an alert for the change event generated at each said client operational computer that differs from respective change event in the first and the second sets of change events.

Beneficially, in the system described above,
the First Change Event Generation Module further comprises a First Hashing Module applying a hash function to the change events generated at the known secure computer producing hashed change events at the known secure computer;
the DSAM module further comprises a Second Hashing Module applying a hash function to the change events resulting form the software update performed on the client operational computer, producing hashed change events at the client operational computer; and
the Processing Module further comprises computational means for matching the hashed change events at the client operational computer with the hashed change events in the first set of hashed change events and generating an alert for the change event, provided the hashed change event at the client operational computer and respective change event in the first set of hashed change events mismatch.

Optionally, in the system of the embodiments of the invention, the security host computer is one of the following: the client operational computer; or the known secure computer.

According to yet another aspect of the invention there is provided a known secure computer for use in a system for real time classification of change events in a computing system comprising one or more client operational computers, each client operational computer performing software update and generating change events resulting from software update, a known secure computer, comprising:

a processor; and
a computer readable storage medium having computer readable instructions stored thereon for execution by the processor, forming a Known Secure Computing Module (KSCM), the KSCM comprising:
(a20-i) an Update Acquisition Module visiting trusted hosts and checking for availability of software update for said one or more client operational computers;
(a20-ii) a First Update Application Module performing the software update in advance of the client operational computers;
(a20-iii) a First Change Event Generation Module generating change events at the known secure computer in response to the software update; and
(a20-iv) a First Sender Module sending the change events generated by the First Change Event Determination Module for comparison with the change events generated at the client operational computers;
the known secure computer being free from inbound connections from other computer systems, and having an operating system and software application programs, which are identical to the operating system and the software application programs running on the client operational computers.

Thus, an improved method and system for real time classification of change events in a computing system, comprising one or more client operational computers, have been provided.

BRIEF DESCRIPTION OF THE DRAWINGS

Embodiments of the invention will now be described, by way of example, with reference to the accompanying drawings in which:

FIG. 8(c) shows an example of fingerprint representation of transitions;

FIG. 9 presents a summary of sample test results according to the embodiment of the invention.

DETAILED DESCRIPTION OF THE EMBODIMENTS OF THE INVENTION

Figure 1A:
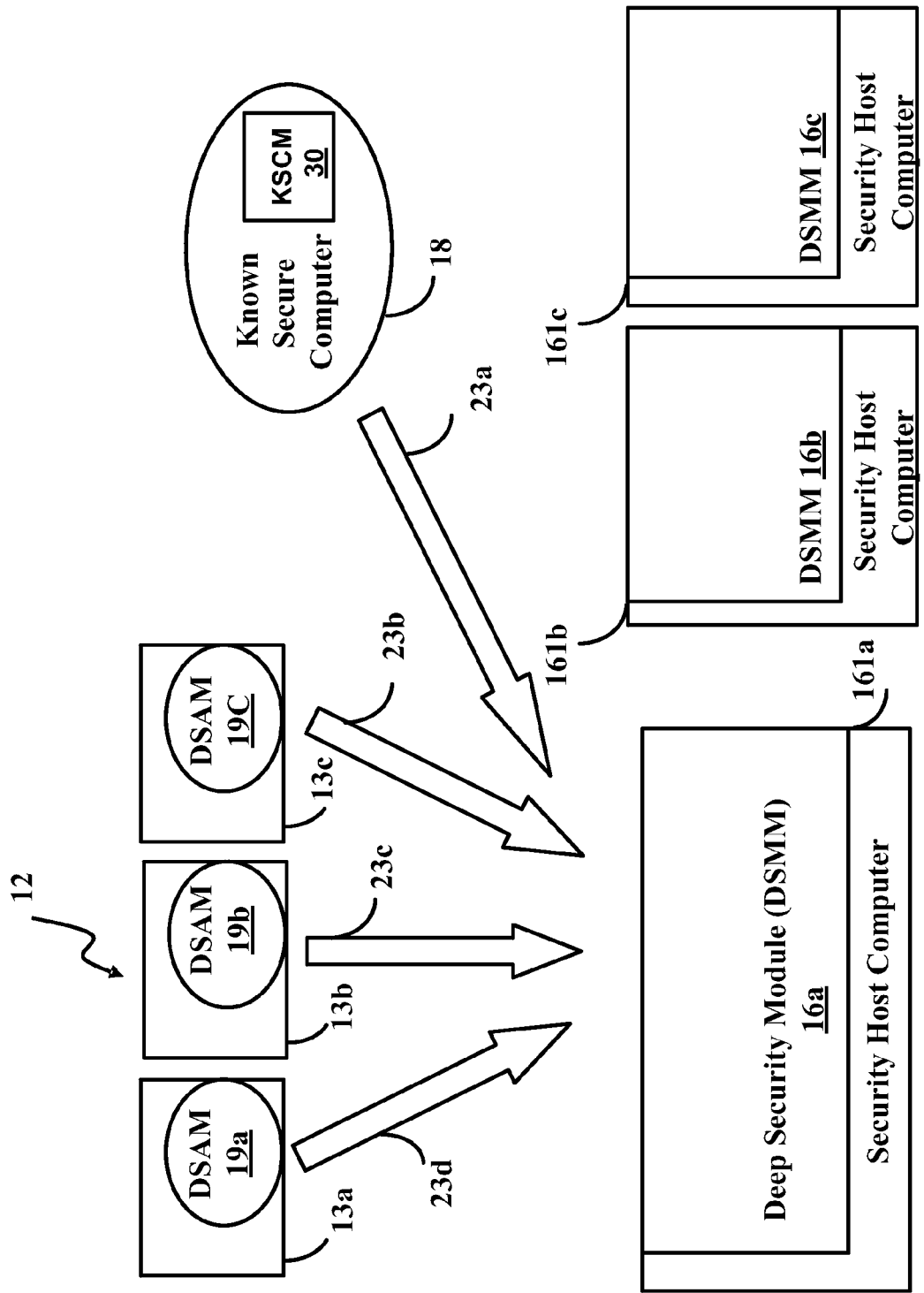
FIG. 1(a) shows a system for real time classification of change events according to the embodiment of the invention.

Before presenting a detailed description of the embodiments of the invention, a glossary and a brief overview of the methods for real time classification of change events used in the embodiments of the invention is provided.

| Glossary | |
| --- | --- |
| change event | indicates changes that occurred on a client operational computer or a known secure computer due to a software update performed on the respective computer |
| change report | report describing change events |
| classification of change events | categorization of change events into permissible and impermissible categories |
| client operational computer | computer used by a client to run required application programs |
| double length hash | combination of the fast hash and the transition hash techniques |
| fast hash | hash of hashes used in fast comparison of two entities |
| known secure computer | a secure computer that is a trusted source of permissible change events. |
| profile | characterizes client operational computers specifying the attributes of software to be updated that are to be monitored |
| fingerprint | cryptographic hash signature |
| snapshot | description of state of a computer including attributes of software to be updated/software that was updated. |
| security host computer | computer hosting the security manager |
| software update | a software patch, a software upgrade or a software downgrade |
| transition | change from one version of software to another |
| transition hash | a set of two hashes representing the original state and resultant state of an entity after a change event |
| trusted hosts | hosts that are known providers of software updates |

The method of the embodiments of the invention relies on using a dedicated known secure computer for real time classification of change events in a computer integrity system. The classification of change events reflects software and configuration settings for the computers. The known secure computer has outbound connections to the Internet, but no inbound connection is allowed. This configuration enables the known secure computer to check for software updates by connecting to trusted hosts or servers storing and providing the updates. By not allowing any other computer connected to the Internet to initiate any connection with the known secure computer, the known secure computer maintains its integrity.

Typically, the known secure computer periodically connects to the trusted hosts providing software updates by using the Internet. The trusted hosts are known providers of software updates and their identity is verified by using mechanisms such as digital certificates and Secure Socket Layer (SSL) connections. A software updating can be of various types that include upgrading/downgrading a software version and applying a patch. Once an update is found on a remote trusted host, the known secure computer performs the update as well. Thus, the known secure computer fulfils its purpose as an updated reference. Performing an update may result in changes occurring on the known secure computer. Whenever changes occur, the known secure computer reports them to a security manager, which stores the changes in a database.

The embodiment of this invention also uses the concept of cryptographic hash signatures. Such a signature is based on a mathematical scheme for demonstrating the authenticity of a document. The goal is to lower the volume of data to be screened, thereby increasing chances of users to see impermissible changes that require attention. The implementation used in the embodiments of this invention includes scanning the file system. By doing so, individual files are "fingerprinted" for future comparison by names and cryptographic hash signatures. Instances where new fingerprints do not match with the previous ones are characterized as change events. The change events may be a result of acceptable alterations to a system such as a permissible software update, patch, new installation or an un-installation. If a change event is not the result of such a permissible operation, an alert is raised for an expert to look into it.

According to the embodiment of the invention, a computer network comprises one or more computers, referred to as security host computers, hosting the security manager called the Deep Security manager (DSM). Each security host computer serves one or more client operational computers used by clients in an enterprise, for example, to run the required application programs. Changes occur on the client operational computers due to various operations that include software updates. When changes occur, the change events are reported by the client operational computer to the DSM. The reported changes are compared with respective change events generated by the known secure computer, referred to as templates for change events, which are stored in the system. Please note that the change event generated by the known secure computer is due to the same operation performed in advance of the client operational computer. If the change events reported by a client operational computer match the respective change events generated by the known secure computer, they are dismissed, otherwise, the reported changes are regarded as suspicious and investigated further by a human analyst.

Different types of client operational computers are available in a computer network, each type performing a designated set of tasks. These types include desktop types, database server types and web server types. The software installed on client operational computers of a specific type can be different from those installed on other client operational computers. Thus, the software allowed for desktops, for example, would likely contain entries that are not allowed for the web servers. Characteristics of a computer type are captured in respective profiles. Changes that are permitted for all client operational computers that belong to one profile may not be permissible for client operational computers belonging to another profile. Thus, the profiles for different types of client operational computers can be stored in the system. Change events reported by a known secure computer that are allowed for a desktop profile, for example, would be considered permissible for all hosts belonging to that profile, but not for hosts of another profile, e.g., the web server profile. A detailed description of the embodiments of the invention is presented next.

FIG. 1(a) shows a system of the embodiments of the invention including a Dynamic System Changes Categorizer 12. The Dynamic System Changes Categorizer 12 comprises computer readable instructions stored in a computer readable medium, for example, computer memory, DVD, CD-ROM or other storage medium, for execution by a processor, forming one or more Deep Security Agent Modules (DSAM) 19a, 19b, 19c, one or more Deep Security Manager Modules (DSMM) 16a, 16b, 16c, and a Known Secure Computer Module (KSCM) 30. The KSCM 30 and the DSAM 19a, 19b, 19c are connected to one or more DSMM 16a, 16b, 16c by a respective computer network connections 23a, 23b, 23c, 23d. The purpose of the DSAM that runs on a respective client operational computer is to detect any intrusion on the client operational computer. By way of example, only three DSAM 19a, 19b and 19c are shown in FIG. 1(a). By way of example also, three client operational computers 13a, 13b and 13c are shown in FIG. 1(a). Please note that each client operational computer 13 comprises a respective DSAM, namely client operational computer 13a comprises the DSAM 19a, client operation computer 13b comprises the DSAM 19b, and client operation computer 13c comprises the DSAM 19c.

The KSCM 30 runs on a known secure computer 18, and is a source of trusted change events. It performs the updates before they are made on the client operational computers 13a, 13b, 13c, and generates the change events that are stored as templates in a computer readable medium of one or more selected DSMM 16a, 16b, 16c running on respective security host computers 161a, 161b, 161c within the client's enterprise.

By way of example, three security host computers 161a, 161b and 161c that perform event classification and different network security related tasks are shown in FIG. 1(a). By way of example, three DSMM 16a, 16b and 16c are shown in FIG. 1(a) respectively installed on security host computers 161a, 161b and 161c. However, it is understood that even a single DSAM, for example, DSAM 19a, and a single DSMM, for example, DSMM 16a, may be sufficient for the purposes of the embodiment of the present invention. A DSMM, for example, DSMM 16a, may be associated with a group of client operational computers, for example 13a, 13b, 13c.

Figure 1B:
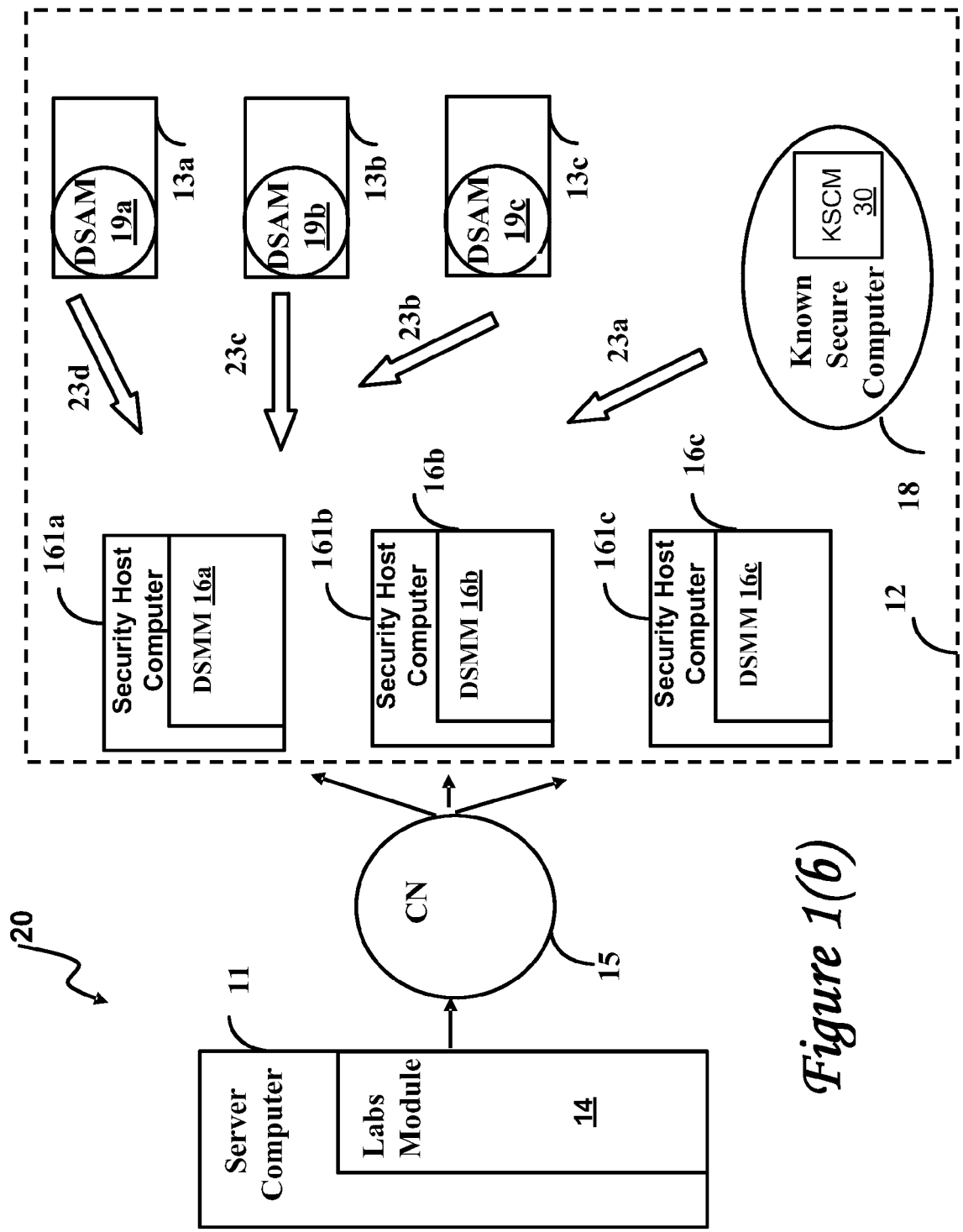
FIG. 1(b) shows an alternate embodiment for the system presented in FIG. 1(a)

FIG. 1(b) shows an alternate embodiment of the system 20, including facilities for updating the software used in the embodiment of the invention. The system 20 shown in FIG. 1(b) includes an additional server computer 11, having a processor, and including a "Labs" module 14 having computer readable instructions stored in a computer readable medium such as computer memory, DVD, CD-ROM or other storage medium. The server computer 11 is connected to the Dynamic System Changes Categorizer 12 by a computer network CN 15. The tasks of the Labs module 14 comprise storing and releasing intended future software updates for implementing by the Dynamic System Changes Categorizer 12 of the embodiment of the present invention. One or more DSMM 16a, 16b, 16c communicate with the Labs module 14, receive software updates, and distribute updates to the DSAM 19a, 19b, 19c over respective computer network connections 23a, 23b, 23c, 23d.

The structure of KSCM 30, DSAM 19a and DSMM 16a are described next.

Figure 2A:
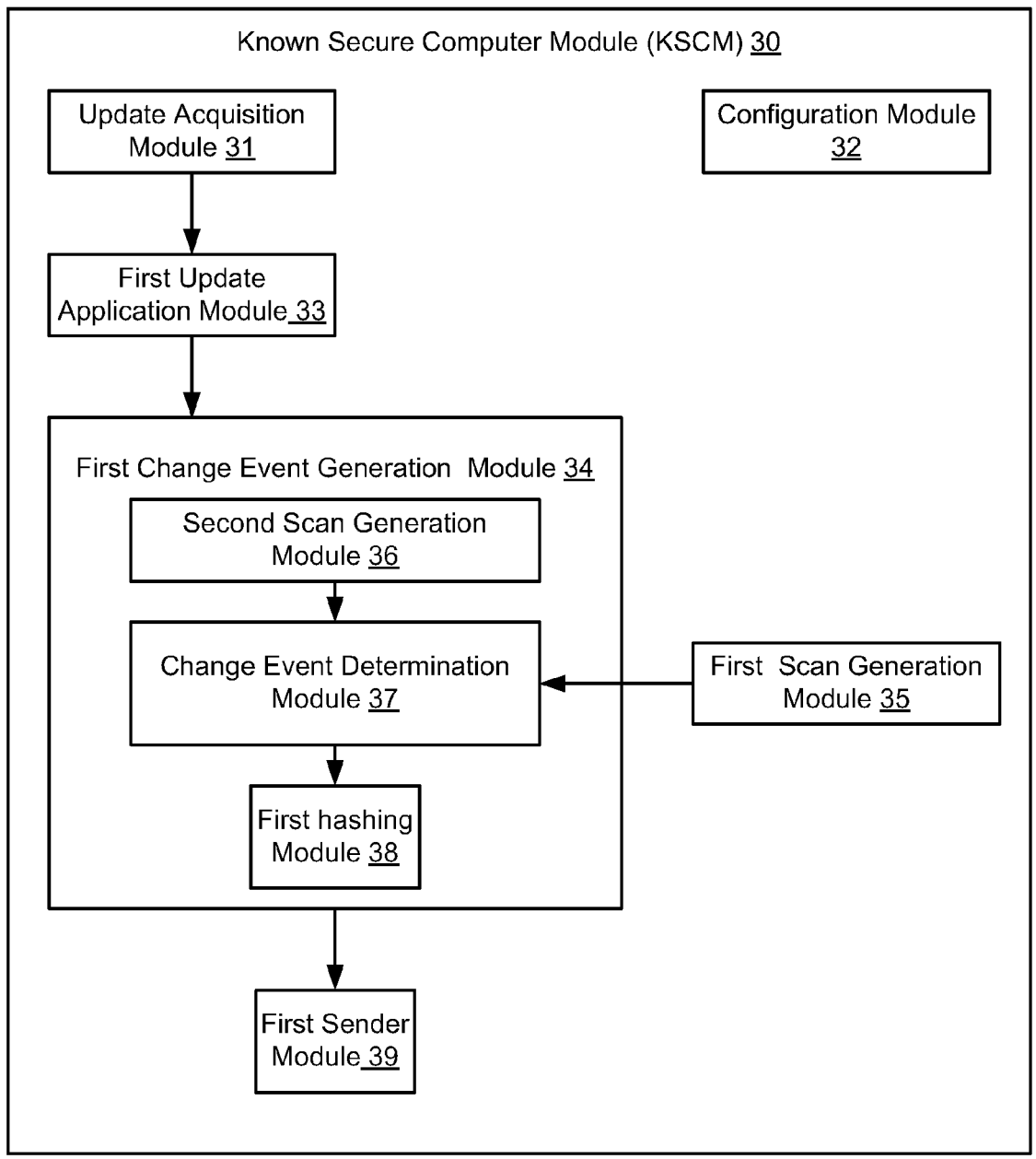
FIG. 2(a) shows the Known Secure Computer Module (KSCM) of FIG. 1(a) in more detail.

FIG. 2(a) shows the structure of the KSCM 30 of FIGS. 1(a) and 1(b). The KSCM 30 comprises an Update Acquisition Module 31, a First Update Application Module 33, a Configuration Module 32, a First Change Event generation Module 34, a First Scan Generation Module 35 and a First Sender Module 39. An output of the First Update Application Module 33 is connected to an input of the First Change Event Generation Module 34. The output of the First Scan Generation Module 35 is connected to the input of the Change Event Determination Module 37. The output of the First Change Event Generation Module 34 is connected to the input of the First Sender Module 39. The Configuration Module 32 configures the operating system and a firewall on the known secure computer 18. The Update Acquisition Module 31 visits trusted hosts (not shown) checking for availability of software updates for one or more client operational computers 13a. 13B, 13c. When an update is available it is applied by the First Update Application Module 33 on the known secure computer 18. The First Change Event generation Module 34 generates the change events at the known secure computer 13 after the update is applied. The First Scan Generation Module 35 generates a scan of the known secure computer before the update is performed. The output of the First Change Event Determination Module 34 comprising change events is sent for storage by the First Sender Module 39.

The First Change Event generation Module 34 in turn comprises a Second Scan Generation Module 36, the output of which is connected to the input of a Change Event Determination Module 37. The output of the Change Event Determination Module 37 is connected the input of First Hashing Module 38. The Second Scan Generation Module 36 performs a scan of the known secure computer 18 after the update is performed, and the Change Even Detection Module 37 uses the outputs of the First Scan Generation Module 35 and the Second Scan Generation Module 36 to generate the change events at the known secure computer 18. The First hashing module applies a hashing function to the output of the Change Event Determination Module 34.

As mentioned above, the Known Secure Computer Module 30 and its respective modules 31-39 comprise computer readable and executable instructions stored in a computer readable medium such as memory for execution by a processor.

Figure 2B:
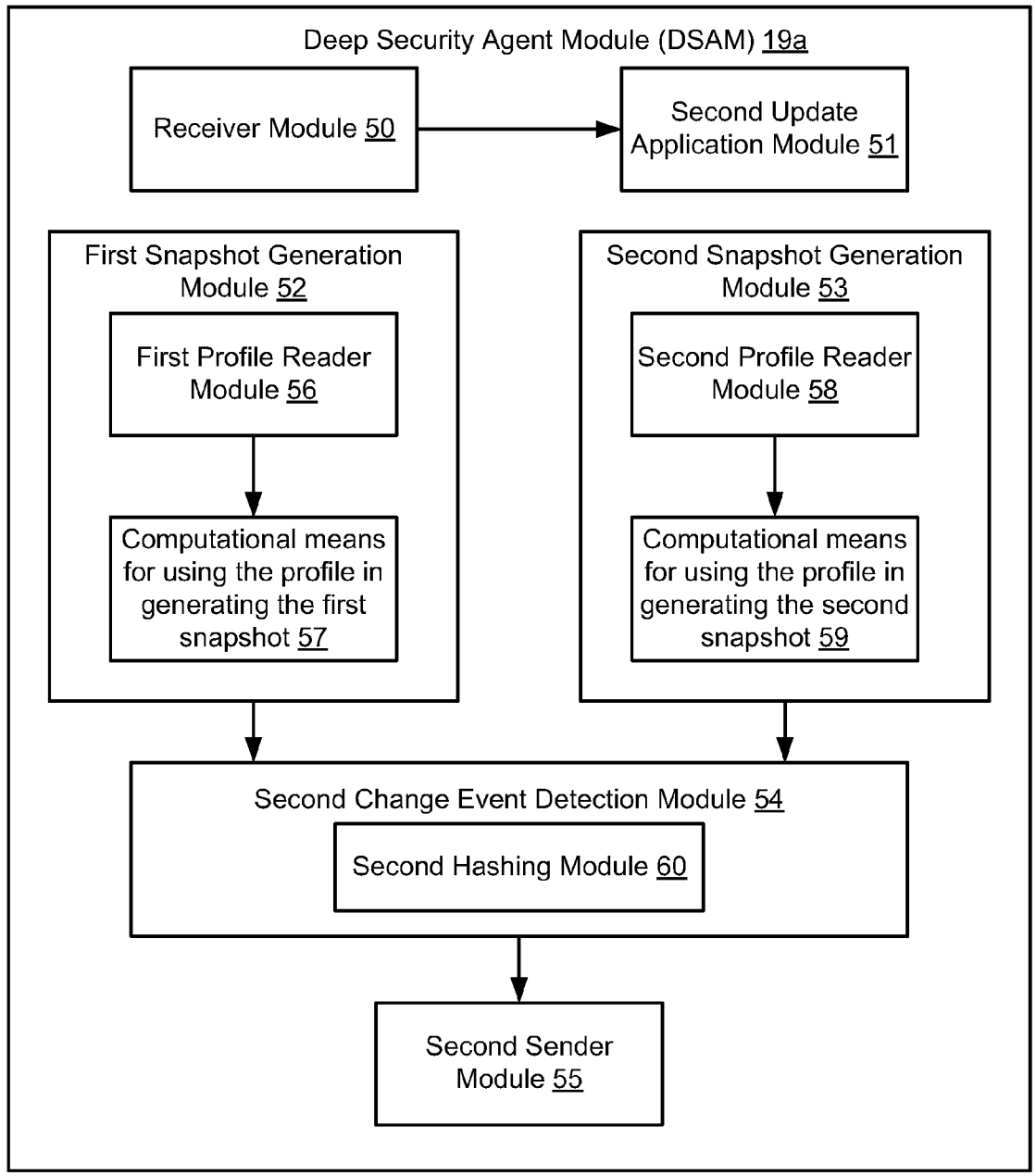
FIG. 2(b) shows the Deep Security Agent Module (DSAM) of FIG. 1(a) in more detail.

The structure of the DSAM, for example DSAM 19a, is shown in FIG. 2(b). The DSAM 19a comprises a Receiver Module 50, a Second Update Application Module 51, a First Snapshot Generation Module 52, a Second Snapshot Generation Module 53 and a Second Sender Module 55. The output of the Receiver Module 50 is connected to the input of the Second Update Application Module 51. The output of the First Snapshot Generation Module 52 is connected to one input of the Second Change Event Generation Module 54, the other input of which is connected to the output of the Second Snapshot Generation Module 53. The output of the Second Change Event Generation Module 54 is connected to the input of the Second Sender Module 55. The Receiver Module 50 receives an update to be performed and the Second Update Application Module 51 applies the update on the client operational computer 13a associated with the DSAM 19a. The First Snapshot Generation Module 52 records a first snapshot of the respective client operational computer 13a before the update is applied whereas the Second Snapshot Generation Module 53 generates a second snapshot of the client operational computer 13 after the application of the update. Please note that the first snapshot includes attributes of the software to be updated whereas the second snapshot taken after the updating operation includes attributes of the software that was updated. The Second Change Event Generation Module 54 processes the fist and the second snapshots to generate change events at the client operational computer 13a that are sent for classification by the Second Sender Module 55.

The First Snapshot Generation Module 52 further comprises a First Profile Reader Module 56 and computational means 57 for using the profile in generating the first snapshot. The First Profile Reader 56 reads the profile for the client operational computer 13 and this profile is provided to the computational means 57 for using the profile in generating the first snapshot.

The Second Snapshot Generation Module 53 further comprises a Second Profile Reader Module 58 and computational means 59 for using the profile in generating the second snapshot. The Second Profile Reader 58 reads the profile for the client operational computer 13 and this profile is provided to the computational means 59 for using the profile in generating the second snapshot.

The Second Change Event Generation Module 54 further comprises a Second Hashing Module 60 that applies a hashing function to the change events resulting from the software update performed at the client operational computer 13a associated with the DSAM 19a.

As mentioned above, the DSAM 19a, including its respective modules 50-59 comprise computer readable and executable instructions stored in a computer readable medium such as memory for execution by a processor. The same applies to DSAMs 19b and 19c.

Figure 2C:
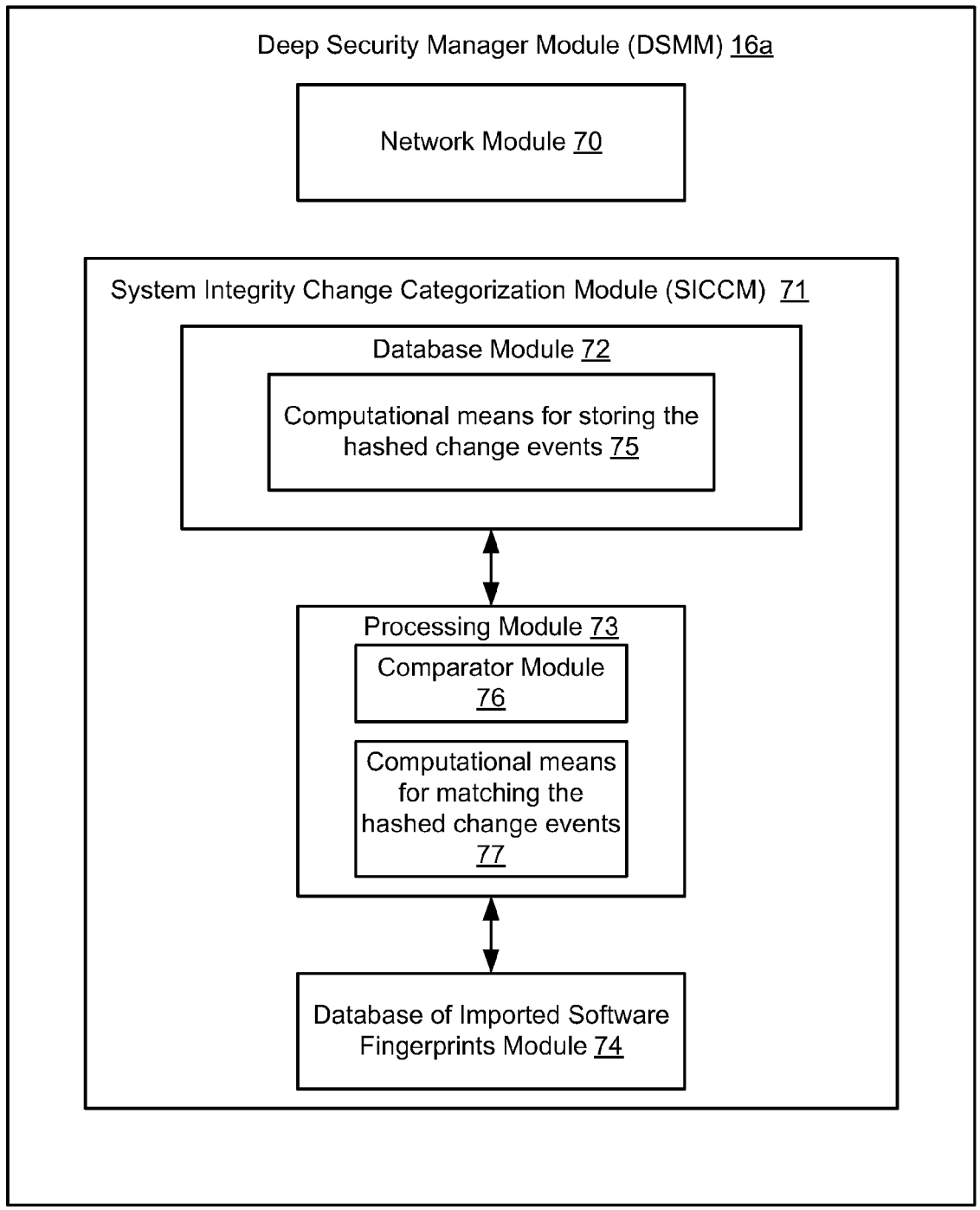
FIG. 2(c) shows the Deep Security Manager Module (DSMM) of FIG. 1(a) in more detail.

FIG. 2(c) shows the structure of a DSMM, for example DSAM 16a. The DSAM 16a comprises a Network Module 70 and a System Integrity Change Categorization Module (SICCM) 71. The Network Module 70 performs network related tasks including network security related tasks, as well as tasks used for distributing updates for the software used in the embodiments of the invention. Distribution of software updates used in the context of an alternate embodiment of the invention was discussed earlier section of this document.

The SICCM 71 comprises a Database Module 72, a Processing Module 73 and a Database of Imported Software Fingerprints Module 74. The Processing Module 73 performs read and write operations on the Data base Module 72 and the Database of Imported Software Fingerprints Module 74. The Database Module 72 includes computational means 75 for storing hashed change events that are generated at the known secure computer 13. The Processing Module comprises a Comparator Module 76 and computational means 77 for matching the hashed change events. The Comparator Module compares the change events generated at each client operational computer 13 with respective change events stored in the Database Module 72 and in the Database of Imported Software Fingerprints Module 74 and generates an alert for the change event generated at each client operational computer that differs from respective change event stored in the two database modules. The computational means 77 for matching the hashed change events compares the hashed change events generated at the client operational computer with the hashed change events stored in the Database Module 72 and the Database of Imported Software Fingerprints Module 74 and generates an alert for the change event that causes a mismatch.

The operation of the SICCM 71 is explained now in more detail. The Database Module 72 stores the change events generated by the known secure computer 18 as templates for change events. Whenever the processing module 73 receives a change event from the known secure computer 18, the change event is saved in the Database Module 72 as a permissible change. The information saved in the Database Module 72 is used for future reference and comparison. The processing module 73 is responsible for handling change events reported from the known secure computer 18 and from the one or more client operational computers 13a, 13b, 13c associated with the DSAM 16a. It is responsible for identifying an impermissible operation for a change event generated at the client operational computers 13a, 13b, 13c. This is achieved by comparing the change events generated at the client operational computers 13a, 13b, 13c with the change events stored in the Database Module 72. In an alternate embodiment, another database module is used for storing templates for change events such as software fingerprints generated by trusted users including third party companies. The purpose of the Database Module for Imported Software Fingerprints 74 is similar to that of the Database Module 72. The difference is that the change events stored in the Database Module 72 are generated by the known secure computer 18 whereas the information included in the Database Module for Imported Software Fingerprints 74 is provided by trusted users including third party companies.

As mentioned above, the DSMM 16a, including its respective modules 70-77 comprise computer readable and executable instructions stored in a computer readable medium such as memory for execution by a processor. The same applies to DSMM 16b and 16c.

A software fingerprint is a cryptographic hash signature. Forensic investigators use a database of cryptographic hash signatures for files that have been shipped from software vendors to eliminate portions of a ceased hard drive in order to increase the efficiency of an investigation. Such software fingerprints can be imported and stored in the Database Module for Imported Software Fingerprints 74, from the database of cryptographic hash signatures or another like it maintained by a third party, to reduce the 'noise' created by a file integrity monitor. Noise is any change event that does not represent an undesired/impermissible change. For example, the change of an executable from one known version to another known version as the result of a desired upgrade would be characterized as noise. If a change is detected but the new state of the file corresponding to the change corresponds to a software fingerprint in the Database Module for Imported Software Fingerprints 74, the change is automatically permitted. An example of such a database of cryptographic hash signatures is the National Institute of Standards and Technology maintained database of vendor shipped cryptographic hash signatures for files called the National Software Reference Library (available at www.nsrl.nist.gov). Thus, for example, if a commercial software is upgraded, or a patch is applied to a software product, the resultant change will be accepted provided it matches one of the imported software fingerprints stored in the Database Module for Imported Software Fingerprints 74.

To summarize the above, the embodiments of the invention provide a distributed solution implemented by DSMM 16a, the known secure computer 18, and the DSAM 19a. The known secure computer 18 and one or more client operational computers 13a, 13b, 13c are initially identically configured. DSAM 19a, 19b, 19c are installed on respective client operational computer 13a, 13b, 13c. Each of the DSAM 19a, 19b, 19c reports change events describing changes in files system to one or more DSMM 16a, 16b, 16c, for example to the DSMM 16a. As mentioned earlier, the known secure computer 18 is allowed outbound communication only, and is denied any inbound connection. Furthermore, it is configured to the required level of security and connected to the computer network 23a of a client in an isolated way. Configuring the known secure computer 18 in the above-mentioned way makes it secure. The client operational computers 13a, 13b, 13c are deployed in their operational role. All computers, both the known secure computer 18 and the client operational computers 13a, 13b, 13c submit change reports comprising change events, for example to the DSMM 16a, and these change reports are analyzed by the SICCM 71, which decides if the change event should be reported or not. The change reports are delivered through a computer network connections 23*a*, 23*b*, 23*c*, 23*d* as identified by the arrows in FIG. 1(*a*).

Figure 3:
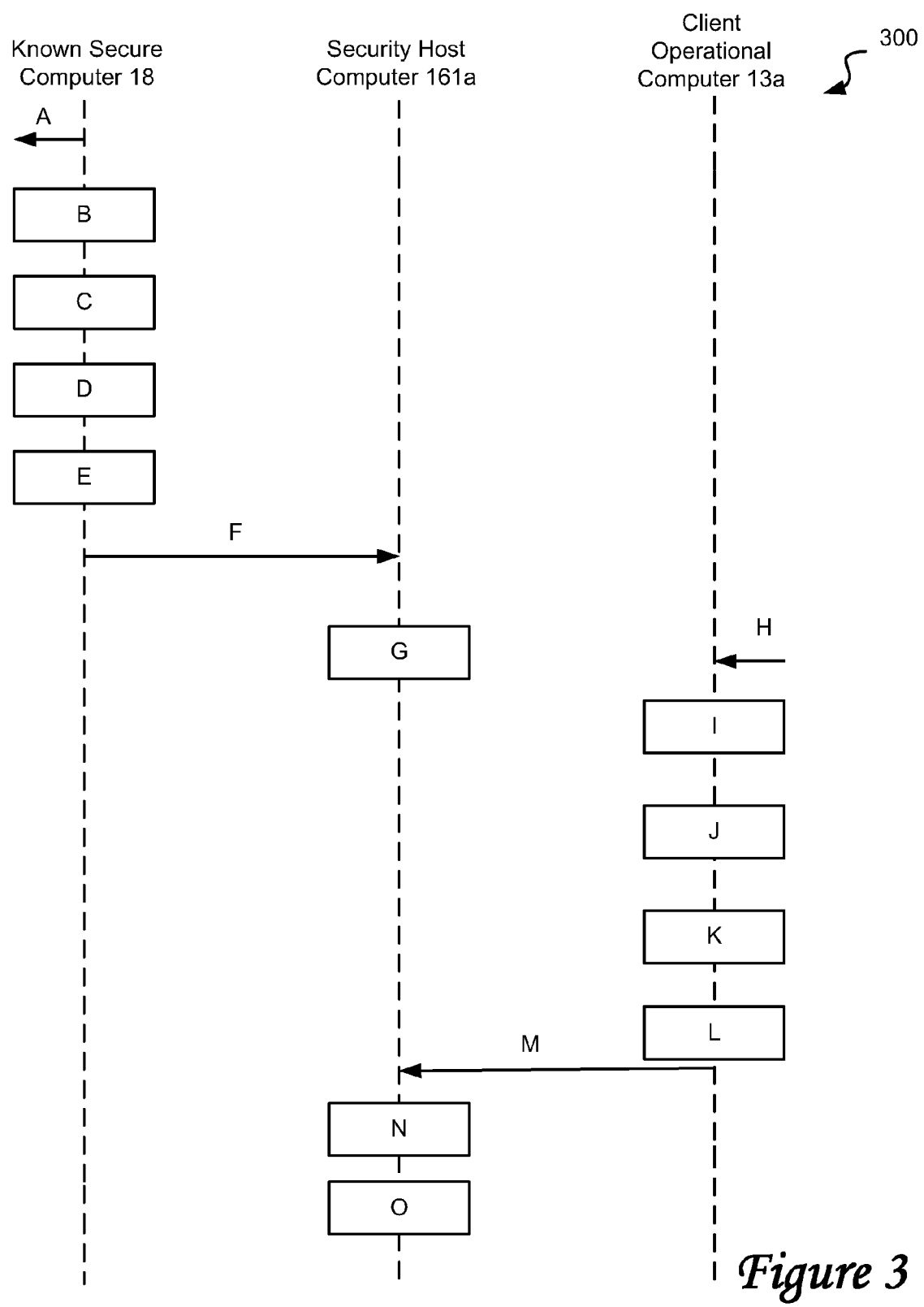
FIG. 3 illustrates a typical sequence of operations performed on the system of FIG. 1(a)

Each of the systems of the embodiments of the invention shown in FIG. 1(*a*), and FIG. 1(*b*), can include multiple general purpose or specialized computer having a CPU and a computer readable medium, e.g., memory, DVD, CD-ROM, floppy, magnetic tape or other storage medium, having computer readable instructions stored thereon for execution by the CPU. Alternatively, the system can be implemented in firmware, or combination of firmware and a specialized computer having a computer readable storage medium. The components of KSCM 30 that comprise modules 31, 32, 33, 34, 35, 36, 37, 38 and 39, the components of DSAM 19 that comprise modules 50, 51, 52, 53, 54, 55, 56, 57, 58 and 59 and the components of DSMM 16 that comprise modules 70, 71, 72, 73, 74, 75, 76 and 77 include a firmware or, alternatively, computer readable instructions stored in a computer readable storage medium for execution by a processor. The Database Module 72 and the Database for Imported Software Fingerprints Module 74 further comprise computer readable data that is stored in a computer readable storage medium. The computational means 57, 59, 75 and 77 comprise computer readable code performing steps of the methods as described above, FIG. 3 shows a diagram 300 illustrating interactions among the KSCM 30 of the known secure computer 18, the DSMM 16*a* running on the security host computer 161*a*, and the DSAM 19*a* running on the client operational computer 13*a* for a typical software update. The sequence of operations shown in FIG. 3 is described next. Each operation identified by its label is briefly described.

Please note that only a single security host computer 161*a* and a single operational computer 13*a* are shown in FIG. 3. However, the distributed solution can readily accommodate multiple DSAM 19*a*, 19*b*, 19*c*, each running on a respective separate client operational computer 13*a*, 13*b*, 13*c*, and multiple DSMM 16*a*, 16*b*, 16*c*, each running on a respective separate security host computer 161*a*, 161*b*, 161*c*.

A. Getting a software update after visiting trusted hosts;
B. Scanning the known secure computer 18;
C. Performing software update;
D. Scanning the known secure computer 18;
E. Generating change events;
F. Sending change events to secure host computer 161*a*;
G. Storing change events generated at the known secure computer 18;
H. Receiving the software update;
I. Scanning the client operational computer 13*a*;
J. Performing the software update;
K. Scanning the client operational computer 13*a*;
L Determining the change events;
M Sending the change events.
N Comparing the change events generated by the known secure computer 18 with respective change events generated at the client operational computer 13*a*;
O Generating an alert for the change event, when the change event at the known secure computer 18 and the client operational computer 13*a* differ.

Windows Update

One common example of an update scenario is that of "Windows Update". This is a service available on computers running the Microsoft Windows operating system. It catalogues Microsoft software running on a given computer and checks the Microsoft update servers (an example of trusted hosts) for patches to that software. It can be configured to alert when new updates are available, to download updates when they become available but not to apply them, or to download and automatically apply updates when they become available.

Fire Fox Update

The default configuration of the Fire Fox web browser is to check the Fire Fox update servers for updates periodically. The default behavior is to check the server for updates each time the program is started. Alternatively, it may also be checked periodically.

The client operational computer 13*a*, 13*b*, or 13*c*, only needs to be scanned using the profiles before and after an update is applied. When updates are not configured to be applied automatically, and are instead manually applied by the operator on the client operational computers 13*a*, 13*b*, 13*c*, the scan can also be run manually after the update is applied. If instead the updates are applied automatically then the client operational computer 13*a*, or 13*b*, 13*c*, is to be set up for real time scanning. In this case the change events are reported as they occur. It is important to note that that the change events generated at the known secure computer 18 are reported from the known secure computer 18 before the change events occur on the client operational computers 13*a*, 13*b*, 13*c*.

Figure 4:
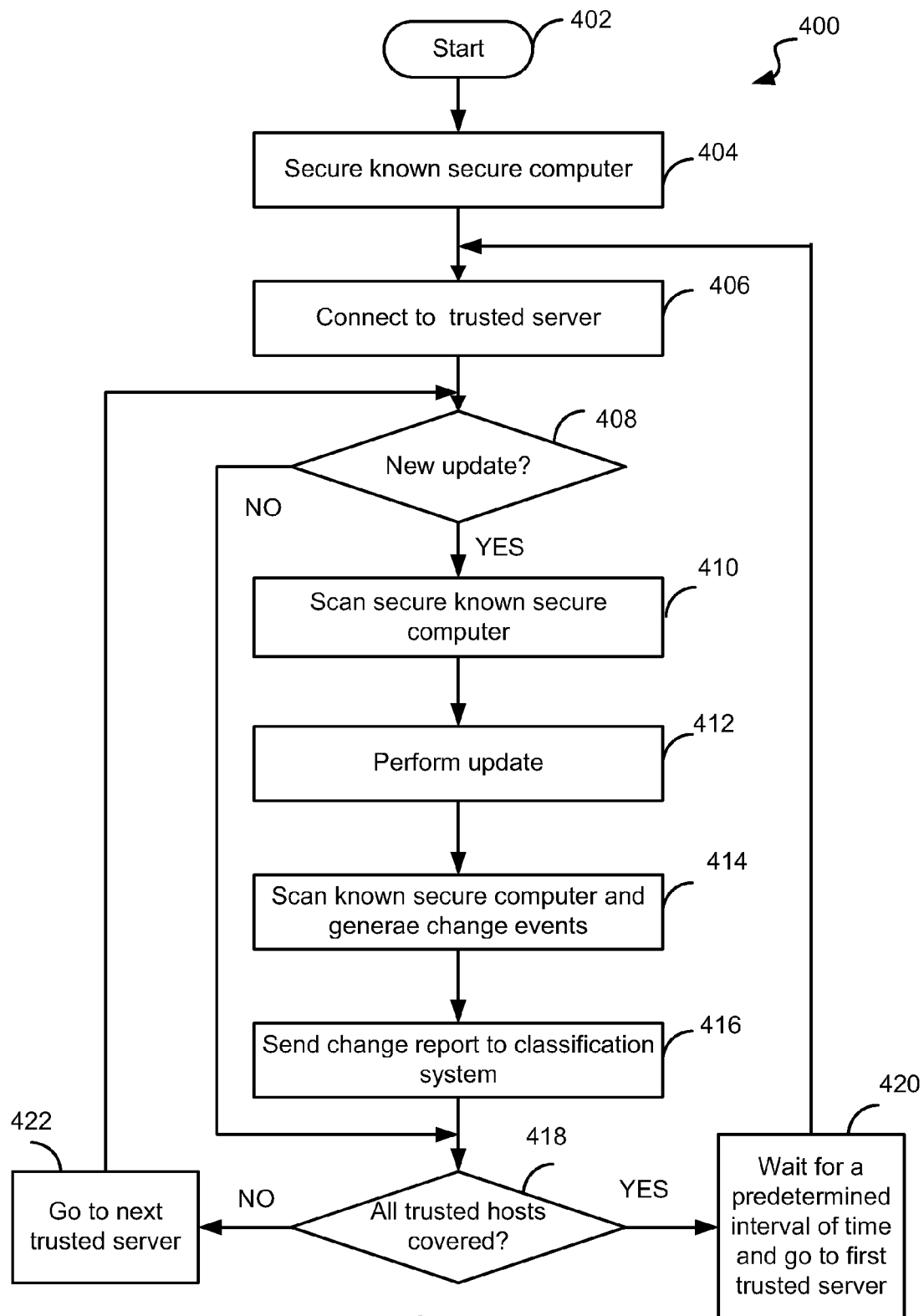
FIG. 4 shows a flowchart illustrating method steps executed at the Known Secure Computer Module (KSCM) of FIG. 1(a) for performing real time classification of events.

The steps of the method for real time classification of change events according to the embodiment of the invention performed at the known secure computer 18 are explained with the help of flowchart 400 displayed in FIG. 4.

Upon start (box 402) the procedure 400 secures the known secure computer 18 (box 404). The known secure computer 18 is then connected to a trusted host (box 406) and the procedure 400 checks whether or not there is a new update available from the trusted host (box 408). If so, the procedure 400 exits 'YES' from box 408, scans the known secure computer (box 410), performs the update (box 412) and scans the known secure computer again and generates the change events (box 414). A change report comprising the change events generated at the known secure computer 18 is then sent to the DSMM, for example DSMM 16*a* (box 416). This change report includes all the change events resulting from the update made on the known secure computer 18. The procedure 400 then checks whether or not all trusted hosts have been checked (box 418). If so, the procedure 400 exits 'YES' from box 418, waits for a predetermined interval of time and goes back to check for updates in the first trusted server (box 420) by looping back to the input of box 406. The cycle of checking the trusted hosts and updating the known secure computer 18 if necessary is then repeated. If all the trusted hosts are not covered, the procedure 400 goes to the next trusted host (box 422) and loops back to the entry of box 408 to check for new updates. If the test made in box 408 indicates that there is no new update then the procedure exits 'NO' from box 408 and proceeds to the input of box 418.

Figure 5:
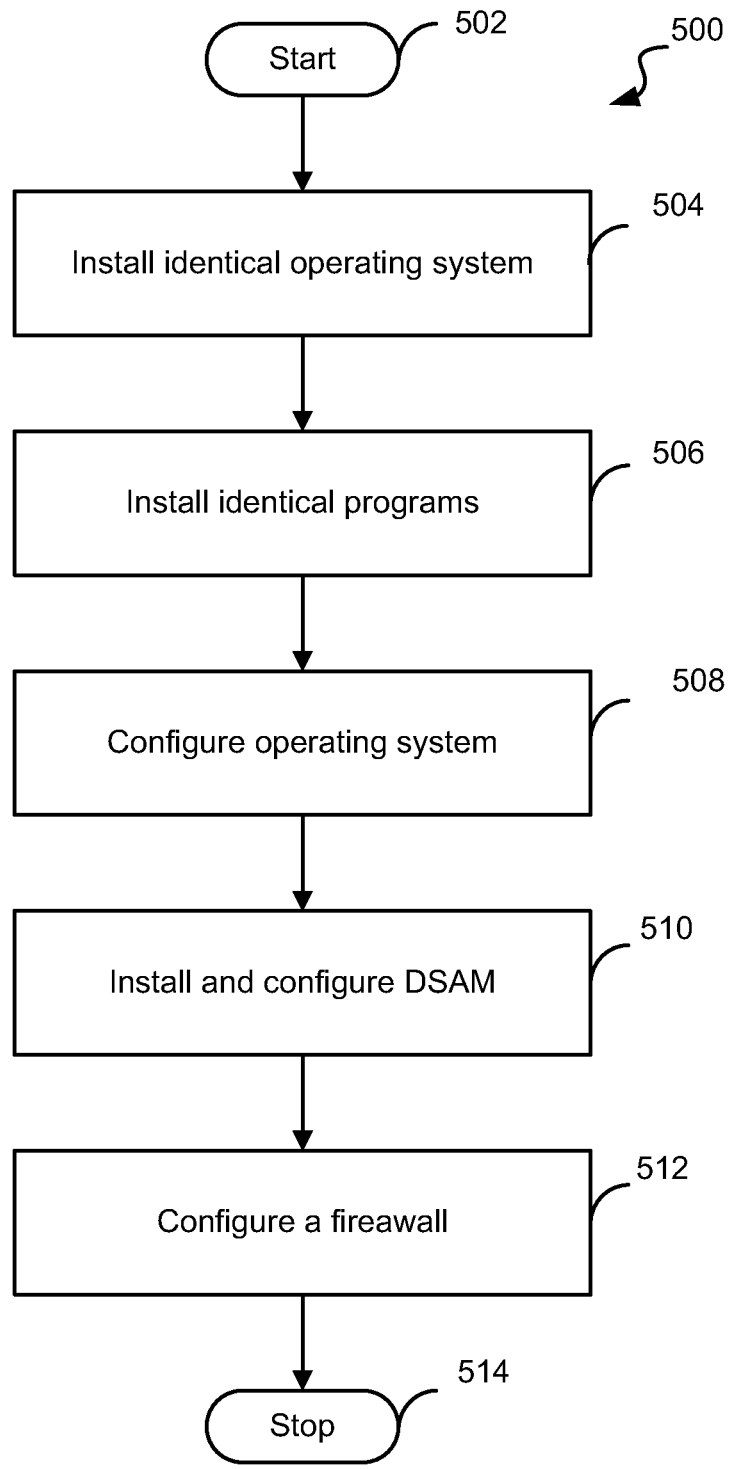
FIG. 5 shows a flowchart illustrating the step "Secure known secure computer" (box 404) in more detail.

The step "Secure known secure computer" (box 404) of the procedure 400 is explained further with the help of the flowchart 500 displayed in FIG. 5. Upon start (box 502), an operating system is installed on the known secure computer 18 (box 504), the operating system being identical to the operating system installed on any of the client operational computers 13*a*, 13*b*, 13*c*. Software programs identical to the ones that are installed on the client operational computers 13*a*, 13*b*, 13*c* are installed on the known secure computer 18 (box 506), and the operating system is configured (box 508). Next, the procedure 500 installs and configures the DSAM 19*a* (box 510) on the client operational computer 13*a*, and similar installs DSAM 19*b* and 19*c* on client operation computers 13b and 13c respectively. The next step is the installation of the firewall on the known secure computer 18 (box 512), after which the procedure 500 exits (box 514).

Before presenting the steps of the method executed by a DSAM, for example by the DSAM 19a, the notion of profiles used by DSAM 19a, 19b, 19c is discussed. When a client operational computer 13a, 13b or 13c receives a software update, the scanning of the client operational computer 13a, 13b and 13c is performed in accordance with the profile for the corresponding client operational computer. Respective profiles characterize client operational computers 13a, 13b, 13c specifying the attributes of the software to be updated that are to be monitored. Profiles are explained further with the help of the two following example.

Examples of Profiles

Profiles for various server computers, such as a web server computer, and a desktop computer have similarities in that they both require monitoring sensitive parts of the operating system such as system files, configuration files, and other operating system related entities. Both of them may also require monitoring the set of installed software and listening ports on the client operational computer 13a, 13b, 13c. Each profile also includes information about how to monitor the software that was expected to be installed on the client operational computer belonging to that profile. However, the set of application software that would be expected to be on a web server computer would be different from a set of application software running on a desktop computer.

On a web server computer, there will be a relatively small, focused set of software including software that achieves the functionality of a web server. A typical desktop computer on the other hand will include a set of application programs such as web browsers and email clients. A database server computer will include database software whereas a mail server computer will include software for receiving and sending emails.

Profiles reference rules that describe which attributes of each file associated with the software to be updated are included in a first snapshot, and which attributes of each file associated with the software that was updated are included in a second snapshot. A profile identifies how to monitor the software running on the type of client operational computer 13a, 13b, 13c associated with its respective profile. These rules tell the DSAM 19a, 19b, 19c which software components to watch, and specifically what attributes of these software components should be watched. For example, changes to the contents of a log file should not be reported as they are expected to change. Changes to the permissions of a log file should however be reported. An executable file on the other hand should have all common attributes monitored. Examples of rules in an Extended Markup Language (XML) format for each of these cases are provided next. An example of a rule that monitors Unix log files for changes to their attributes is presented first.

```
<FileSet base="/var/log">
    <include key="**/*" />
    <attributes>
        <permissions/>
    </attributes>
</FileSet>
```

The rule states that all files in /var/log and its subdirectories need to be monitored for changes to their permissions (and only to their permissions).

An example of a rule, which monitors the executable and "dll" files of an Apache install for changes to the standard set of attributes is presented next. These attributes include file contents and permissions.

```
<FileSet base="${env.PROGRAMFILES}\Apache*">
    <include key="**/*.exe"/>
    <include key="**/*.dll"/>
</FileSet>
```

The "base" attribute identifies the directory to which the rule is to be applied. In this case it is built from an environment setting that stores the location of the "Program Files" directory. The rule states that any immediate subdirectory of that directory which begins with the string "Apache" should be used as the base. The "include" tags have keys that indicate that all sub directories of these directories are to be included, but only to monitor files ending in ".exe" and ".dll" respectively. Because no attributes are specifically listed, the default set of attributes for files will be monitored. his includes the contents and permissions.

Software updates such as software upgrades/downgrades and software patches give rise to change events that are to be classified in real time. Examples of performing updates in two different scenarios are presented next.

Figure 6:
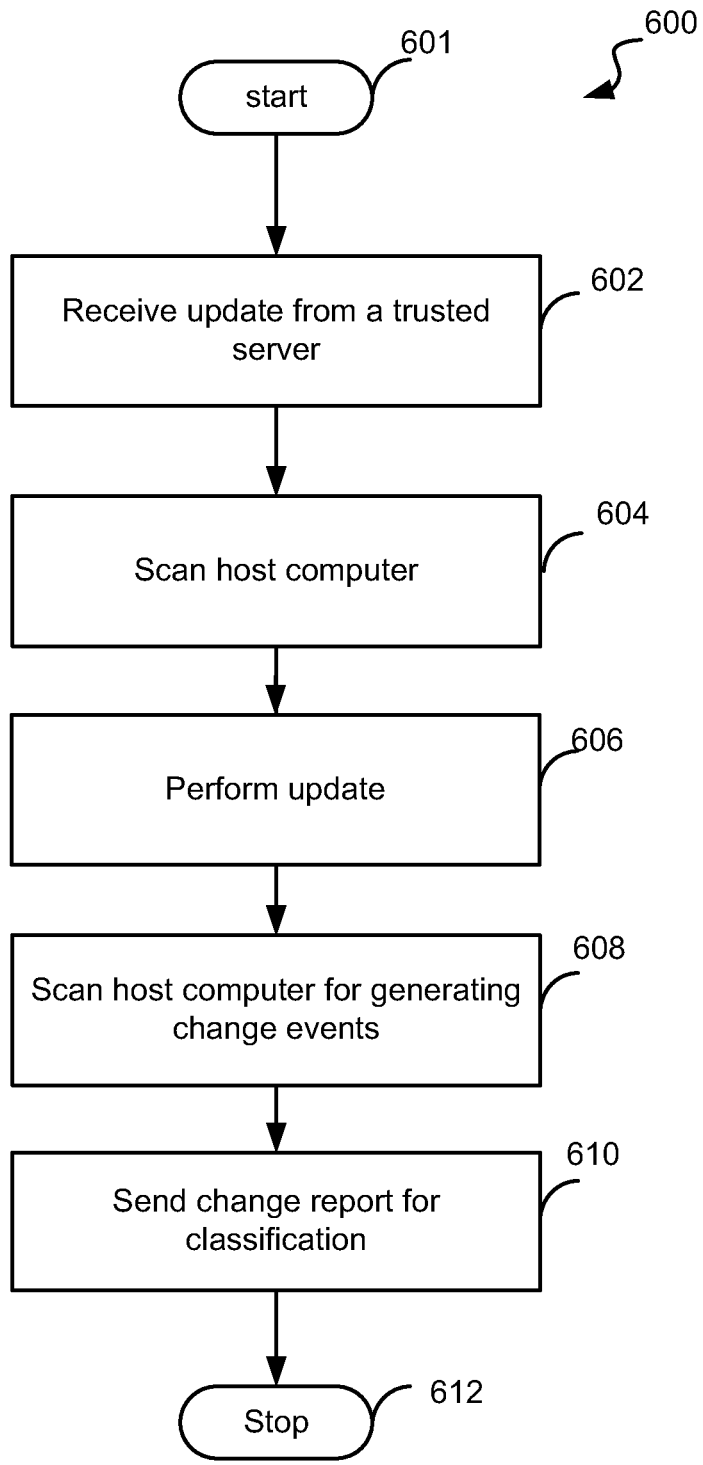
FIG. 6 shows a flowchart illustrating method steps executed at the DSAM of FIG. 1(a) for performing real time classification of events.

The steps of the method executed by a DSAM, for example DSAM 19a, which uses profiles discussed earlier are explained with the help of the flowchart 600 displayed in FIG. 6. Procedure 600 is executed at a client operational computer, in this example at the client operation computer 13a, when a new update arrives from a trusted host. Upon start (box 601), the procedure 600 receives the update from the trusted host (box 602) and prepares to perform the update. The client operational computer 13a receiving the update is scanned first (box 604) to produce a first snapshot of the client operational computer, the first snapshot including attributes of the software to be updated. The procedure 600 then performs the update (box 606) and scans the client operational computer for generating change events resulting from the update (box 608). The scan produces a second snapshot of the client operational computer 13a, the second snapshot including attributes of software that was updated. The change events are generated by comparing the first snapshot with the second snapshot and the change report comprising change events generated by the client operational computer. The procedure sends the change report for classification to the DSMM 19a (box 610) and exits (box 612).

Figure 7:
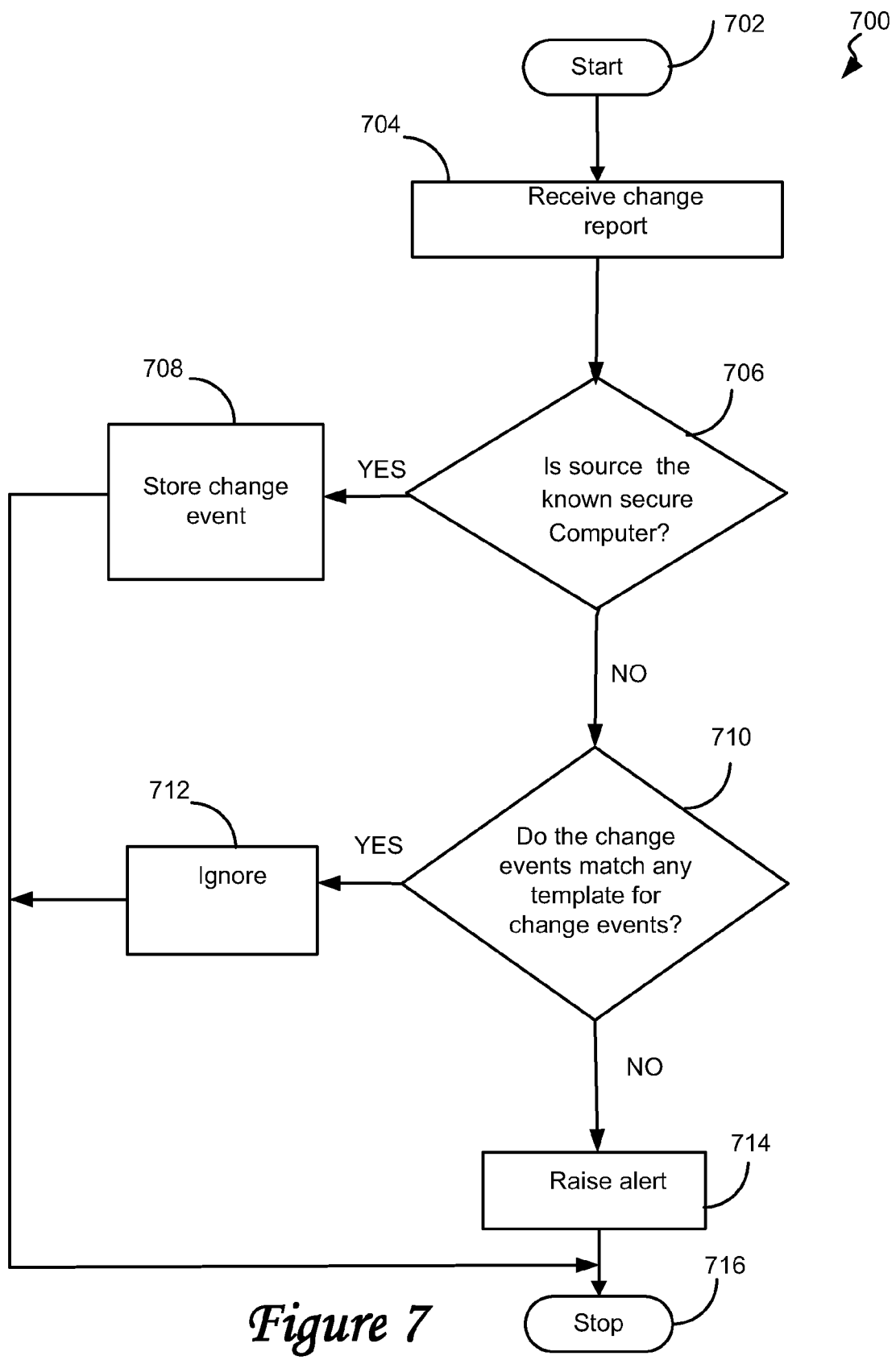
FIG. 7 shows a flowchart illustrating method steps executed at System Integrity Change Categorization Module (SICCM) 71 of FIG. 2(c) for performing real time classification of events.

The steps of the method executed by SICCM 71 in the DSMM, for example DSMM 16a, are explained with the help of the flowchart 700 displayed in FIG. 7. The method is executed when change report generated by the known secure computer 18 or by a client operational computer, for example the client operation computer 13a, arrives. Upon start (box 702), the procedure 700 receives a change report (box 704). Whether the source of the change report is the known secure computer 18 is checked next (box 706). If so, the procedure 700 exits 'YES' from box 706, stores the change events generated at the known secure computer 18 in the Database Module 72 (box 708) and exits (box 716). Otherwise, the procedure 700 exits 'NO' from box 706 and checks if the change events in the change report match any of the stored change events stored in the Database Module 72 and in the Database Module for Imported Software Finger prints 74. If so, the procedure exits 'YES' from box 710, ignores the change report (box 712) and exits (box 716). If any of the change events in the report does not match the stored change events, the procedure exits 'NO' from box 710, raises an alert (box 714) and exits (box 716).

Real time classification of events performed by the methods of the embodiments of the invention requires fast comparisons to be made. Fingerprinting used in the generation of change events enables such fast comparisons. Fingerprinting is based on hashing that is used to perform fast comparisons required in the matching of change events. A software update performed on a client operational computer 13a, 13b, 13c typically gives rise to change events resulting in the contents of various files related to the software being updated. Fast hashes can be effectively used in such situation.

The "Fast Hash" or the "hash of hashes" is the hash that is used for doing a quick comparison of two entities to determine if they are different. Typical entities concerning this invention are files. However, the same technique may be used for other types of entities as well, for example, registry keys and values, users, entries in the installed software set, and open ports. Each entity has a set of attributes that are monitored. For an entity such as a file, these attributes include the permissions for the file, the last modified date and/or a hash of the contents of the file. The fast hash is a hash of the canonical representation of the attributes. If the fast hashes differ, one can infer that the two entities differ without doing a more time consuming attribute by attribute comparison. Please note that the fast hash is stored for the "current" copy of each entity, so it only needs to be computed once, not for each comparison.

As mentioned earlier, hashes, or fast hashes are stored in the Database module 72, comprising respective means for storing the hashed change events 75. In most enterprises, making transitions from one version of software to a given set of versions are allowed, while transitions to other versions are not permitted. Whether or not a transition on a particular client operational computer 13a, 13b or 13c is permissible can be checked by using a set of stored fingerprints for permissible transitions.

In the embodiments of the invention, a database containing allowed fingerprints of files associated with each software version is augmented with information about what transitions are allowed between the fingerprints. Conveniently, these sets of fingerprints for allowable transitions may be stored in the Database Module for Imported Software Fingerprints 74. This is done in such a way as to both record observed permissible transitions, and to infer further allowed transitions from the observed transitions.

The fingerprint includes a unique identifier for the file for the software being updated and its hash, augmented with acceptable transitions. Each hash stores a set of references to other hashes that have been accepted as a valid hash for other permissible transitions. Each entry is a pair of fingerprints with a single reference between them.

It is also possible to infer further permissible transitions that have not been specifically specified.

One of the motivations for storing information regarding transitions is to prevent "rollback" computer attacks. A rollback attack occurs when an attacker moves from a new version of the software to an older version. If there were no transitions recorded, the system would allow this. However, this needs to be prevented as the older version may have security holes that were patched in the newer version. Such an impermissible backward transition is prevented by the embodiments of the invention by storing and inferring the direction of change, or transition, between the fingerprints.

Figure 8A:
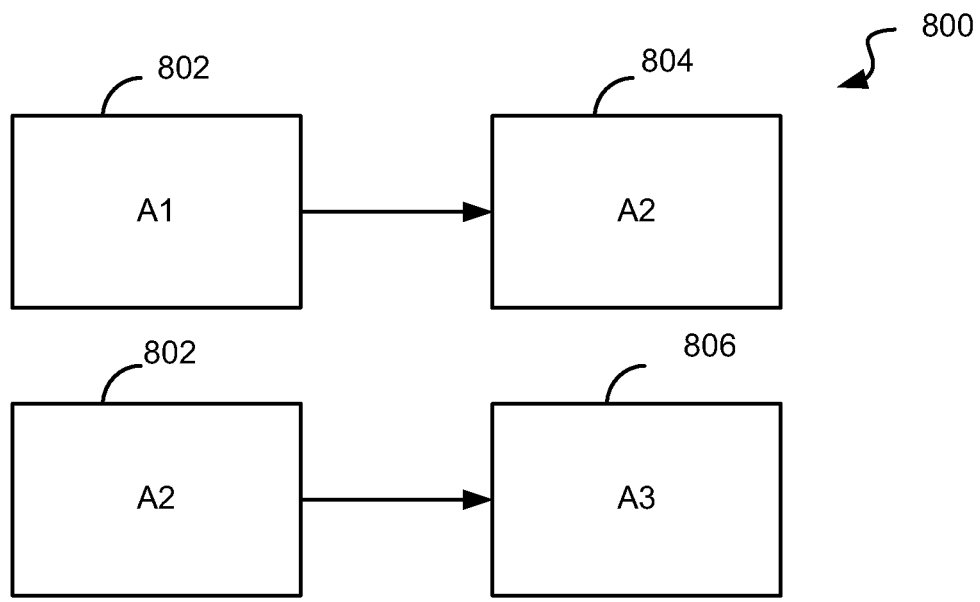
FIG. 8(a) illustrates the use of transitions in real time classification of events.
Figure 8B:
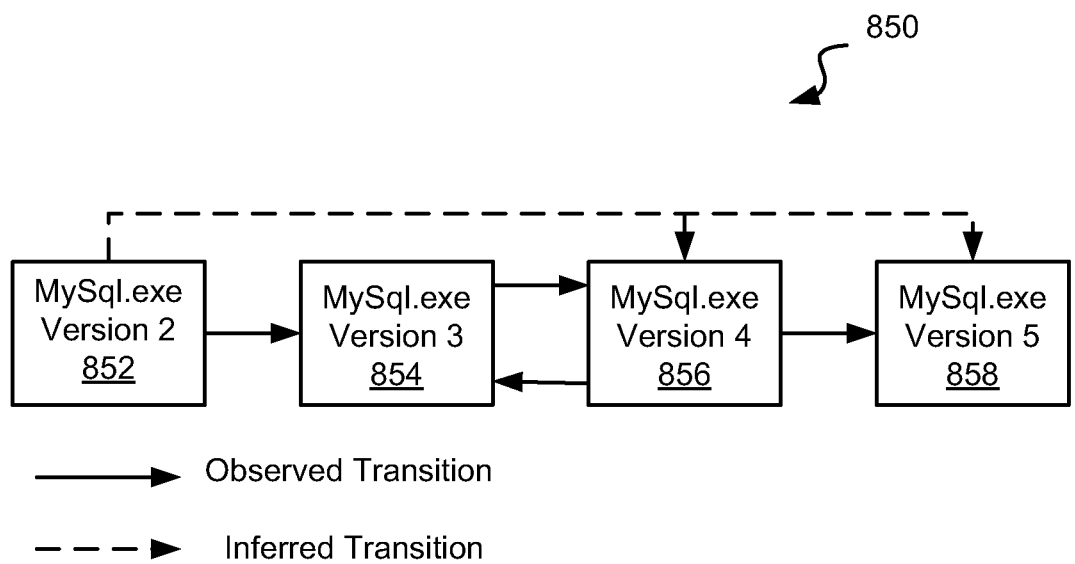
FIG. 8(b) shows an example demonstrating the use of transitions.

Consider an example 800 shown in FIG. 8(*a*), where A1 802, A2 804 and A3 806 represent various versions of a given software. In the example 800, a transition from A1 802 to A2 804, and a transition from A2 804 to A3 806 are allowed. A transition from A1 802 to A3 806 that can be inferred from the example 800 is also allowed. However, a backward transition such as from A3 806 to A2 804 is not allowed.

This information depicted in the example 800 of FIG. 8(*a*) is used to determine if a given transition between software version is allowed. When a file change corresponding to a change event is validated, the previous hash for the file and a new hash are presented. If there is an observed (explicitly specified) or inferred permissible transition from the previous hash to the new hash, the transition is allowed, otherwise it is rejected, and an alert is raised.

An example 850 is presented in FIG. 8(*b*) illustrating a hypothetical example for the MySql.exe software shipped with known MySql database. Four versions, MySql.exe Version 2 852, MySql.exe Version 3 854, MySql.exe Version 4 856 and MySql.exe Version 5 858 are shown in the FIG. 8(*b*). In this scenario, there has been a relatively linear forward upgrade transition progressing from MySql.exe Version 2 852 to MySql.exe Version 5 858, with a single rollback (downgrade) from MySql.exe Version 4 856 to MySql.exe Version 3 854. It should be noted that specific versions of the executable file, MySql.exe are included in the diagram of FIG. 8(*b*) only to aid the discussion; it is contemplated that other variations to the example presented below can be used within the scope of the present invention.

Examples of permissible transitions, which are directly specified in FIG. 8(*b*), include MySql.exe Version 2 852 to MySql.exe Version 3 854, MySql.exe Version 3 854 to MySql.exe Version 4 856 and MySql.exe Version 4 856 to MySql.exe Version 5 858. Downgrading from MySql.exe Version 4 856 to MySql.exe Version 3 854 would also be allowed for this reason.

As mentioned earlier, observed transitions can be used to produce inferred transitions in a transitive manner. Because MySql.exe Version 2 852 has an observed transition to MySql.exe Version 3 854, which in turn has been observed to make a transition to MySql.exe Version 4 856, MySql.exe Version 2 852 is allowed to make a transition directly to MySql.exe Version 4. The diagram 850 shows this inferred transition, as well as the inferred transition from MySql.exe Version 2 852 to MySql.exe Version 5 858. There are no inferred backwards transitions in the diagram, but in general they can be made allowable by using the embodiments of the invention. Although a backward transition may be allowed in this way, but it should be used only if required.

A combination of the fast hash and the transition hash techniques used in the embodiments of the invention are described next.

Double Length Hash

The double length hash combines the concept of fast hash with transition hash for supporting detection of changes. A fast hash value that may be up to twice the length of an entity's fast hash is used. A double length is the concatenation of the fast hash of the entity before the event occurred, and the fast hash of the entity after the event occurred. If the original entity does not have a fast hash, for example in the case of a create event that occurs when a new file created by the software update, or the resulting entity does not have a fast hash, for example, in the case of a delete event that occurs when a file is removed from the system due to the software update, then a "no hash" marker is included in its place. This allows a quick comparison of two change events from different sources to determine if they represent the same transition. The same double length hash implies that they represent the same transition.

An example of using hashing for handling transitions is illustrated in FIG. 8(c), which shows a Fingerprint Table 890 displaying an identification (ID) of each software version that is identified by a numeric ID. The fingerprint column presents hash corresponding to an ID.

A Transition Table 892 shown in FIG. 8(c) illustrates permissible transitions from a given version recorded in the first column of the Table 892 to a next version recorded in the corresponding position in the second column of the Table 892.

Table 890 shows the ID and fingerprint. Table 892 shows changes for the entities in 890. The "fromID" is the entity before the change, the "toID" is the entity after the change. For example, the first row shows a change to an entity with fingerprint 0019F857-C04A-CAA5-325CE23D1CFB8008 resulting in it having fingerprint 001BE2FB-5F47-936A-E15C-6C372DC88ED8.

In FIG. 8(c), examples of explicitly permissible transitions include: from 342 to 238, from 516 to 732, and from 732 to 516, which is an explicitly permissible backwards transition. The last transition is a backwards transition because we have already seen 516 become 732. If 732 then becomes 516 the change has been undone or "moved backwards". Examples of implicitly allowed transitions include: 342 to 732 (via 342 to 238 to 516 to 732).

A summary of measurement data obtained from tests performed according to the embodiments of the invention is presented in FIG. 9. The tests were run by setting up one known secure computer 18 and one client operational computer 13a. The listed update was applied to the known secure computer 18, and the change events collected and marked as permissible and secure. The same update was then applied to the client operational computer 13a. Please note that in FIG. 9, a tagged event is a change event generated at the client operational computer 13a that matched a change event generated by the known secure computer 18. A short explanation for each of the column headers in FIG. 9 is provided below:

Test #: The Test Number
Description: Description of the Test
Host: The name of the client operational computer on which the test was performed (client operational computer 13a; known secure computer 18)
Events: The number of change events that occurred during the test
Tagged: The number of change events that were tagged
UnTagged: The number of change events that were not tagged.
% Tagged: The percentage of events that were tagged
% Untagged: The percentage of events that were not tagged
Total %: This a check and balance field to make sure the previous two fields always sum to 100%.

The % Tagged and % Untagged are the two columns that are of interest for this discussion. The data presented in FIG. 9 demonstrates that a large number of change events can be classified as permissible and can thus be removed form the list of change events that need to be examined manually by a human expert.

In comparison, in prior art methods, all change events would need to be examined. The alternative would be to accept all change events without examining, for example, if they happened during a scheduled patch time. This has a danger of accepting invalid events that happened to occur during a patch time.

Three additional alternate embodiments of the invention are described next.

The first of these alternate embodiments combines the security host computer 161a with the client operational computer, for example 13a. Both the DSMM 16a and the DSAM 19a run on the same security host computer 161a. The communication between the DSMM 16a and the DSAM 19a are internal to the client operational computer 13a where as the computer network connection 23a is used for communication between the client operational computer 13a and the known secure computer 18.

The second alternate embodiment includes the known secure computer 18 running the KSCM 30, and the security host computer 161a running the DSMM 16a. This alternate embodiment is useful in a situation, in which the client operational computers 13a, 13b, 13c inherently include facilities for generating the change events.

The third alternate embodiment combines the security host computer 161a with the known secure computer 18. The KSCM 30 and the DSMM 16a run on the same physical computer, and communicate with the client operational computers 13a, 13b, 13c through the network 23a. Since the computer running the KSCM 30 cannot have any inbound connections, the DSMM 16a periodically polls each client operational computer 13a, 13b, 13c that stores the change events in a buffer until it is pulled by the DSMM 16a.

Thus, an improved method and system for providing computer integrity by using real time classification of events in a computer integrity system have been provided.

The embodiments of the present invention provide the following advantages. The methods of the embodiment of the invention use a dynamic recording of changes in a clients operational computer, e.g., 13a, which is updated automatically and in real time by using the known secure computer 18, whenever a new software update for the client operational computer 13a is available. In contrast to building only a one time baseline, which is currently the prior art industry standard and which does not address future patches and software upgrades, the methods and system of the embodiment of the present invention allow an automatic classification of changes in real time, accepting allowable changes and raising an alert for unknown changes.

Although a homogeneous system including client operational computers 13a, 13b, 13c running the same operating system was discussed earlier, a heterogeneous system deploying a set of operating systems, each running on a specific subset of client operational computers 13a, 13b, 13c can be implemented in a modification to the embodiments of the present invention. Multiple known secure computers 18, each running a specific operating system from the set of operating systems, can generate the change events. The change events generated by a given known secure computer 18 are to be compared with the change events generated by the subset of client operational computers, for example, 13b and 13c that run the same operating system as the given known secure computer 18.

Figure 10:
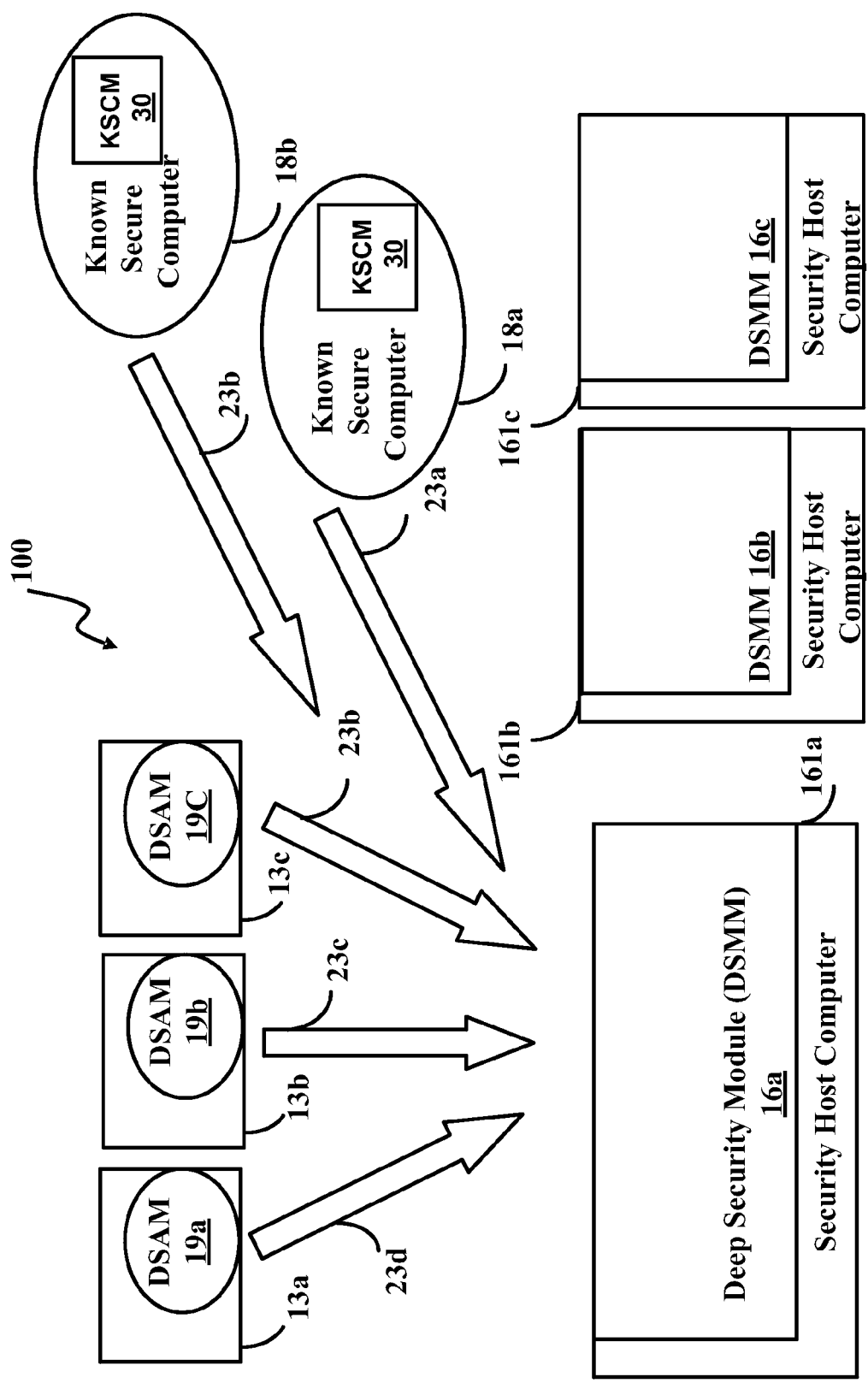
FIG. 10 illustrates a modified system according to yet another embodiment of the invention suitable for heterogeneous computer environment.

An example of such a system 100 is presented in FIG. 10. The system 100 comprises two known secure computers 18a and 18b using network connections 23a and 23b respectively. The client operational computer 13a runs one operating system whereas the client operational computers 13b and 13c run a different operating system. The known secure computer 18a runs the same operating system as client operational computer 13a whereas the known secure computer 18b runs the same operating system as the client operational computers 13b and 13c. The known secure computer 18a performs the same updates that are performed by the client operational computer 13a and the change events generated at the known secure computer 18a are compared by the DSMM 16a with the change events generated at the client operational computer 13a. The known secure computer 18b performs the updates performed by the client operational computers 13b and 13c and the change events generated at the known secure computer 18b are compared by the DSMM 16a with the change events generated at the client operational computers 13b and 13c. Alternatively, a single known secure computer 18 running multiple operating systems on top of a hypervisor can be used. Each type of operating system running on the client operational computers 13a, 13b, 13c is to be run on top of the hypervisor (not shown). Each operating system in the known secure computer 18 will correspond to a virtual machine that will generate change events that are to be compared with the change events generated by the subset of client operational computers, for example 13b and 13c, which run the same operating system. The two database modules, Database Module 72 and Database of Imported Software Fingerprints Module 74 were described. Alternatively, the two database modules can be combined into a single database module. Other remote database modules can also be incorporated for providing additional imported software fingerprints.

Although specific embodiments of the invention have been described in detail, it should be understood that the described embodiments are intended to be illustrative and not restrictive. Various modifications may be made within the scope of the following claims without departing from the scope of the invention in its broader aspect.

What is claimed is:

1. A system for real time classification of change events in a client operational computer, the system comprising:
   a known secure computer free from inbound connections, the known secure computer comprising a processor, and a memory having computer readable instructions stored thereon for execution by the processor, forming an operating system and software application programs on the known secure computer, which are identical to an operating system and software application programs running on the client operational computer;
   the computer readable instructions causing the processor to:
      visit trusted host computers and check for availability of a software update for the client operational computer;
      perform the software update on the known secure computer prior to performing the software update on the client operational computer;
      generate change events at the known secure computer in response to the software update;
   the client operational computer comprising another processor and another memory having computer readable instructions stored thereon causing the another processor to generate change events resulting from the software update performed on the client operational computer.

2. The system of claim 1, further comprising a security host computer having yet another processor and yet another memory having computer readable instructions stored thereon, causing the yet another processor to:
   compare the change events at the known secure computer with respective change events generated at the client operational computer; and
   generate an alert, provided a change event at the known secure computer and a corresponding change event generated at the client operational computer differ.

3. The system of claim 2, wherein the security host computer is one of the following:
   the client operational computer; or
   the known secure computer.

4. The system of claim 1, wherein the computer readable instructions further cause the processor to:
   configure the operating system installed on the known secure computer; and
   configure a firewall on the known secure computer to prevent the inbound connections.

5. The system of claim 1, wherein the computer readable instructions further cause the processor to scan the known secure computer before performing the software update at the known secure computer to produce a first scan comprising attributes of software to be updated.

6. The system of claim 5, wherein the computer readable instructions further cause the processor to:
   scan the known secure computer after performing the software update in the known secure computer to produce a second scan comprising attributes of software that has been updated; and
   to compare the first and the second scans, thereby determining the change events at the known secure computer.

7. The system of claim 1, wherein the computer readable instructions further cause the another processor to:
   receive the software update; and
   record a first snapshot comprising attributes of software to be updated on the client operational computer.

8. The system of claim 7, wherein the computer readable instructions further cause the another processor to:
   perform the software update on the client operational computer;
   generate a second snapshot, comprising attributes of software that has been updated on the client operational computer; and
   compare the first snapshot and the second snapshot, thereby determining the change events at the client operational computer.

9. The system of claim 8, wherein the computer readable instructions further cause the another processor to:
   read a profile associated with a type of the client operational computer, the profile specifying the attributes of software to be included in the first snapshot and the attributes of software to be included in the second snapshot; and
   use the profile in recording the first and second snapshots.

10. The system of claim 8, wherein the computer readable instructions further cause the processor to:
    store the change events generated at the known secure computer as a first set of change events; and
    generate and store a second set of change events, including change events generated by trusted users comprising third parties.

11. The system of claim 10, wherein the computer readable instructions further cause the processor or the another processor to:
    compare the change events generated at the client operational computer with respective change events in the first and second sets of change events; and
    generate the alert for a change event generated at the client operational computer that differs from a respective change event in the first and second sets of change events.

12. The system of claim 1, wherein the computer readable instructions further cause:
    the processor to apply a hash function to the change events generated at the known secure computer producing hashed change events at the known secure computer; and
    the another processor to apply a hash function to the change events resulting from the software update performed on the client operational computer, producing hashed change events at the client operational computer.

13. The system of claim 12, wherein the computer readable instructions further cause one of the processor or the another processor, or yet another processor of yet another computer to:

match the hashed change events at the client operational computer with the hashed change events at the known secure computer; and generate an alert, provided a hashed change event at the known secure computer and a corresponding hashed change event at the client operational computer mismatch.

14. A computer network, comprising:

a plurality of computers configured to communicate with each other, comprising:

a client operational computer; and a known secure computer free from inbound connections, the known secure computer comprising a processor, and a memory having computer readable instructions stored thereon for execution by the processor, forming an operating system and software application programs on the known secure computer, which are identical to an operating system and software application programs running on the client operational computer;

the computer readable instructions causing the processor to:

visit trusted host computers and check for availability of a software update for the client operational computer;

perform the software update on the known secure computer prior to performing the software update on the client operational computer;

generate change events at the known secure computer in response to the software update;

the client operational computer comprising another processor and another memory having computer readable instructions stored thereon causing the another processor to generate change events resulting from the software update performed on the client operational computer.

15. In a system for real time classification of change events in a computing system comprising at least one client operational computer subject to performing a software update and generating change events resulting from the software update, a known secure computer, the known secure computer comprising:

a processor; and a memory having computer readable instructions stored thereon for execution by the processor, causing the processor to:

visit trusted hosts and check for availability of software update for the at least one client operational computer;

perform the software update at the known secure computer prior to performing the software update at the at least one client operational computer;

generate change events at the known secure computer in response to the software update; and prepare the change events for comparison with change events generated at the at least one client operational computer;

the known secure computer being free from inbound connections from other computers, and having an operating system and software application programs, which are identical to the operating system and the software application programs running on the at least one client operational computer.

16. In the system for real time classification of change events, the known secure computer of claim 15, wherein the computer readable instructions further cause the processor to:

compare the change events at the known secure computer with respective change events generated at the client operational computer; and generate an alert for a change event, provided the change event at the known secure computer and the change event generated at the client operational computer differ.

17. In the system for real time classification of change events, the known secure computer of claim 15, wherein the computer readable instructions further cause the processor to send the change events at the known secure computer to yet another computer for comparing with change events generated at the at least one client operational computer.

18. In the system for real time classification of change events, the known secure computer of claim 15, wherein the computer readable instructions further cause the processor to:

apply a hash function to the change events generated at the known secure computer producing hashed change events at the known secure computer; and match hashed change events at the client operational computer, obtained by applying a hash function to to the change events generated at the client operational computer, with the hashed change events at the known secure computer.

19. In the system for real time classification of change events, the known secure computer of claim 18, wherein the computer readable instructions further cause the processor to generate an alert, provided a hashed change event at the known secure computer and a corresponding hashed change event at the client operational computer mismatch.

20. A computer network, comprising:

a plurality of computers configured to communicate with each other, the plurality of computers comprising:

at least one client operational computer; and a known secure computer, comprising:

a processor: and a memory having computer readable instructions stored thereon for execution by the processor, causing the processor to:

visit trusted hosts and check for availability of software update for the at least one client operational computer;

perform the software update at the known secure computer prior to performing the software update at the at least one client operational computer;

generate change events at the known secure computer in response to the software update; and prepare the change events for comparison with change events generated at the at least one client operational computer;

the known secure computer being free from inbound connections from other computers, and having an operating system and software application programs, which are identical to the operating system and the software application programs running on the at least one client operational computer.

\* \* \* \* \*